ELECTRONIC FREQUENCY ANALYZER DEVICE

Filed April 6, 1948 9 Sheets-Sheet 1

INVENTOR.
JOSEPH WEBER
BY
A H Helvestine
ATTORNEY

April 15, 1958 J. WEBER 2,831,147

ELECTRONIC FREQUENCY ANALYZER DEVICE

Filed April 6, 1948 9 Sheets-Sheet 2

INVENTOR.
JOSEPH WEBER
BY A H Helvestine
ATTORNEY

INVENTOR.
JOSEPH WEBER
BY
A H Helvestine
ATTORNEY

April 15, 1958 J. WEBER 2,831,147

ELECTRONIC FREQUENCY ANALYZER DEVICE

Filed April 6, 1948 9 Sheets-Sheet 4

INVENTOR.
JOSEPH WEBER
BY
[signature]
ATTORNEY

April 15, 1958 J. WEBER 2,831,147

ELECTRONIC FREQUENCY ANALYZER DEVICE

Filed April 6, 1948 9 Sheets-Sheet 5

INVENTOR.
JOSEPH WEBER

BY [signature]

ATTORNEY

April 15, 1958 J. WEBER 2,831,147

ELECTRONIC FREQUENCY ANALYZER DEVICE

Filed April 6, 1948 9 Sheets-Sheet 6

INVENTOR.
JOSEPH WEBER
BY
ATTORNEY

April 15, 1958 J. WEBER 2,831,147

ELECTRONIC FREQUENCY ANALYZER DEVICE

Filed April 6, 1948 9 Sheets-Sheet 7

INVENTOR.
JOSEPH WEBER
BY
A H Helwestine
ATTORNEY

April 15, 1958 J. WEBER 2,831,147

ELECTRONIC FREQUENCY ANALYZER DEVICE

Filed April 6, 1948 9 Sheets-Sheet 8

INVENTOR.
JOSEPH WEBER

BY [signature]

ATTORNEY

April 15, 1958 J. WEBER 2,831,147

ELECTRONIC FREQUENCY ANALYZER DEVICE

Filed April 6, 1948 9 Sheets-Sheet 9

INVENTOR.
JOSEPH WEBER

BY [signature]

ATTORNEY 2,831,147

ELECTRONIC FREQUENCY ANALYZER DEVICE

Joseph Weber, United States Navy, Silver Spring, Md.

Application April 6, 1948, Serial No. 19,393

39 Claims. (Cl. 315—39)

(Granted under Title 35, U. S. Code (1952), sec. 266)

This invention relates to a method and a means for exploring a portion of the radio frequency spectrum for determining the presence of any of its component frequencies, and more particularly for causing charged particles to move under the influence of combined magnetic and electric fields in a periodic manner and in response to the component frequencies, which are present in that portion of the spectrum being investigated, in such manner that discrete indications corresponding to the respective frequency components are simultaneously portrayed.

This application is a continuation-in-part of Serial No. 706,930, filed October 31, 1946, for Electron Tube Device, and which is now abandoned.

In many fields of endeavor it is desirable and useful to obtain information regarding the spectral distribution of radio frequency energy, such as for example, in analyzing signal activity over a portion of the radio frequency spectrum. In other instances, it is desirable to analyze a complex alternating wave into its component frequencies. The usefulness of a device for obtaining such information is greatly increased if the signals or frequency components that are detected can be displayed simultaneously for visual indication and interpretation.

Receiving systems have been developed for achieving a "panoramic" display upon a cathode-ray tube of the frequency components present in a narrow band of the radio frequency spectrum by rapidly scanning the band. Such systems, however, have an inherent defect—frequency components are missed if their presence does not happen to coincide with the instant during which the particular frequency is being scanned or investigated. Such systems can not cope with the problem of detecting infrequent or intermittent types of signals. Accordingly, it is evident that any particular portion of the radio frequency spectrum to be explored cannot be examined successively frequency by frequency—but must be investigated simultaneously to obtain a series of discrete indications concurrent with the presence of any respective frequency components.

The objectionable features are overcome by the present invention—which is based essentially upon the principle of subjecting charged particles, such as electrons, to the simultaneous influence of a magnetic field and an electric field. The charged particles acquire different natural periods of oscillation depending upon their respective paths of movement relative to these fields. Varying the intensity of one of the fields as to time by the alternating potential of a frequency component will cause those charged particles having a natural oscillatory period resonant with the alternating potential to acquire sufficient energy to result in an indication. Thus, for example, when a pure sinusoidal electromotive force—which is a form of simple harmonic motion—is impressed upon the device, it will be in resonance only with certain ones of the electrons. Hence, only those electrons moving in resonance with the impressed electro-motive force will acquire sufficient energy to indicate the presence of the electromagnetic force by impinging upon a fluorescent screen or equivalent indicating or target means. Furthermore, since any complex alternating wave can be resolved into a series of simple sinusoidal waves of definite frequencies, all such frequencies will be indicated. A mechanical analogue of a device operating as described above is the vibrating reed frequency indicator wherein the reeds vibrate in resonance with certain respective frequencies. This type of frequency indicator, although suitable for use with low-frequency alternating currents, cannot be used for radio frequency work due to the mechanical inertia of its parts.

It is therefore an object of this invention to provide a means and a method for investigating simultaneously the frequency components of a portion of the radio frequency spectrum and to detect and indicate simultaneously any and all such components that are present.

Another object is to separate a complex alternating wave into its frequency components by electronic means.

A further object is to provide a means and a method for subjecting a complex alternating wave for examination to determine its component frequencies and to indicate the same simultaneously as discrete quantities.

It is an added object of the present invention to provide an electronic frequency analyzer for indicating the existence of, and analyzing the frequency components of, an alternating wave by discrete visual traces or by transmitting the information to separate and individual indicating means, each being responsive to one or a number of such frequency components.

Since any periodic alternating wave can be broken into a series of simple sinusoidal waves of definite frequencies, it is a still further object to provide an electronic frequency indicator for determining simultaneously all such frequency components of one or more alternating waves.

It is a still further additional object to provide an electronic frequency indicator employing charged particles for determining the composition of a complex periodic wave.

An additional object is to provide a frequency analyzer utilizing charged particles within mutually coacting magnetic and electric fields for indicating the frequency components of a signal, a complex wave alternating electromagnetic wave and the like.

It is a still further object to provide a device for analyzing non-sinusoidal and periodic or non-periodic electromagnetic waves into their component frequencies and for indicating the same as a series of discrete but related indications.

Other objects and many of the attendant advantages of this invention will be readily appreciated as the same becomes better understood by reference to the following detailed description when considered in connection with the accompanying drawings in which like reference characters refer to like parts throughout the various figures and wherein.

To facilitate an understanding of the invention, three mutually perpendicular axes, X, Y, and Z are shown in certain figures. However, the designation of these axes are not to be construed as limiting the application or construction of the invention to any particular direction.

Figures 1, 2, 3:
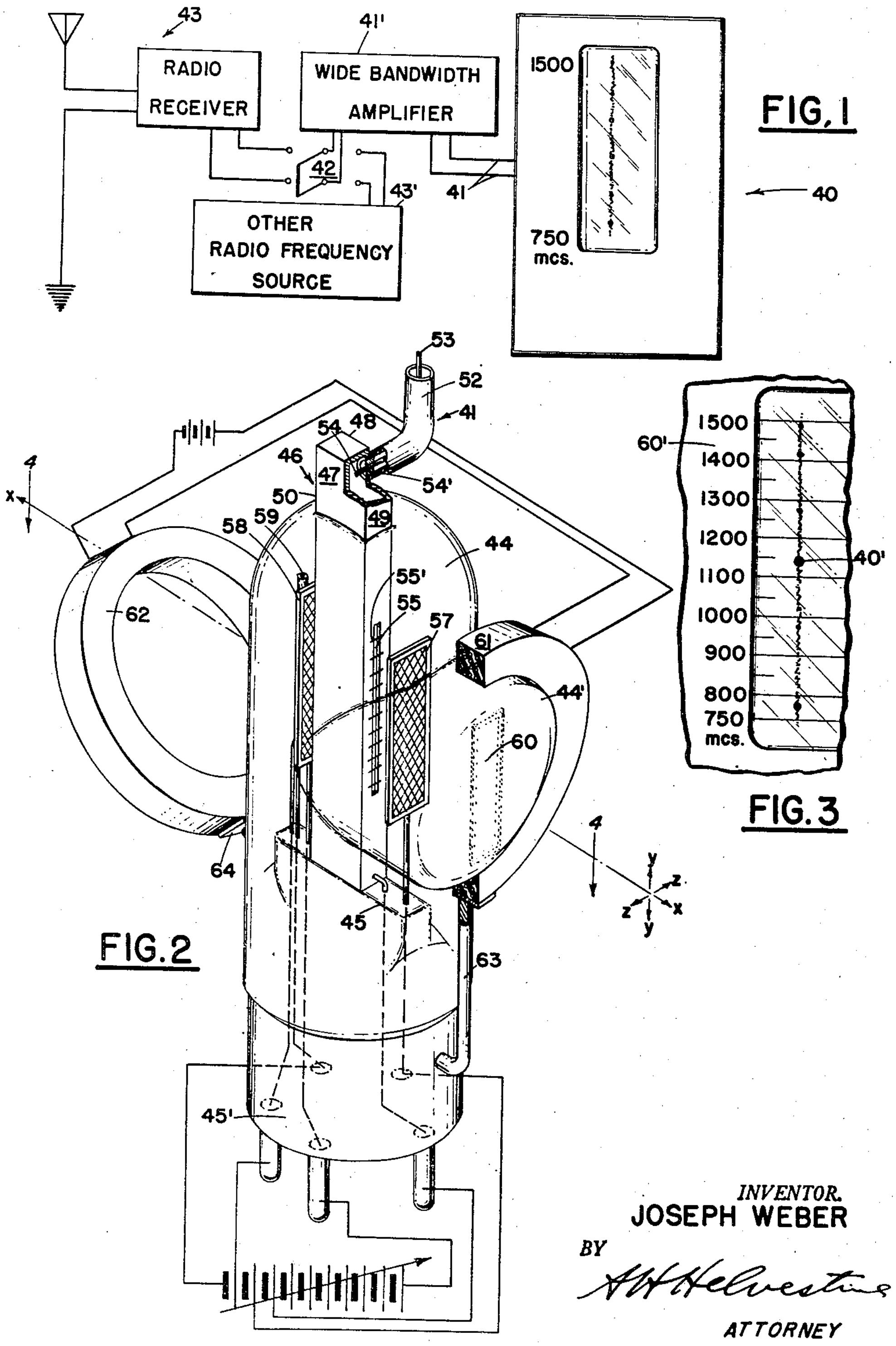
Figure 1 is a block diagram showing the association of the invention with related apparatus.
Figure 2 is a perspective view of an embodiment of the invention employing a non-uniform magnetic field.
Figure 3 is an elevational view showing the type of spot display obtained on the fluorescent target screen, each spot indicating the existence of a respective frequency.

The electronic frequency analyzer is generally indicated as 40 in Figure 1 and may be connected through a transmission line 41 to a wide bandwidth amplifier 41′ which in turn may be fed through a switching mechanism 42 from either an antenna system 43 or from any other radio frequency source 43′ whose frequency spectrum is to be determined.

The amplifier 41′ may be of any suitable construction, capable of amplifying bandwidths of the order of 1000 megacycles, more or less. One type of amplifier suitable for this purpose is the traveling wave amplifier of the type shown and described in the February 1947 issue of the Proceedings of the Institute of Radio Engineers. It forms no part of the present disclosure other than as a means for amplifying the signal received by the antenna system or other signal source to a sufficient strength to operate the device 40.

Consequently, it should be understod that the present disclosure of the systems 43 or 43′ and amplifier 41′ are merely illustrative of the means for introducing signals or alternating waves into the indicator 40 and are not to be considered limiting factors.

Inasmuch as the device 40 can be used to analyze any complex alternating wave in a manner to appear, it is also capable of being used as a laboratory type spectrum analyzer for the study of the spectra of radio frequency generators and other similar machines, all of which is generally indicated by 43′.

An embodiment of the invention 40, as shown in Figure 2, has an evacuated glass envelope 44 and although shown as being T-shaped, it may assume various other shapes to accommodate the numerous elements without departing from the invention or affecting its operation.

The envelope 44 has a stem 45 upon which rests a wave guide 46 having side faces 47, 48 and end faces 49, 50 forming a rectangular cross section of suitable dimensions. The wave guide 46 is anchored to the stem 45 and is hermetically sealed into and through the walls of the envelope 44 in any conventional manner. The wave guide 46 extends above the envelope a sufficient distance for the purpose of attaching to it the transmission line 41 which, as shown in Figure 2 may be in the form of a coaxial cable, running from the amplifier 41′. The transmission line 41 may be any other equivalent form of electrical conducting system for feeding the alternating electromagnetic wave to be analyzed into its components.

Figure 4:
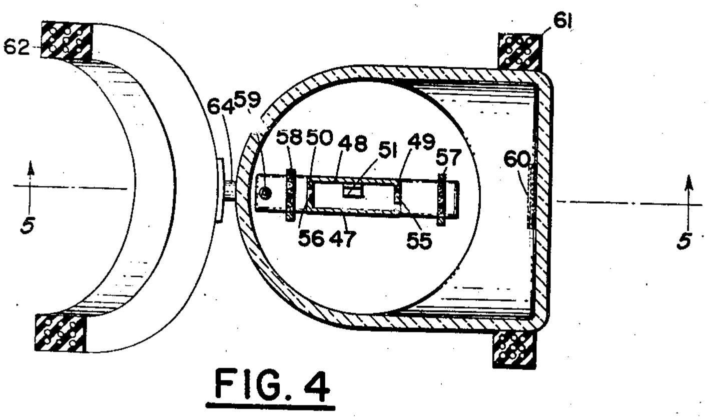
Figure 4 is a transverse cross section as seen from line 4—4 of Figure 2.

The wave guide may be shorted at its top and terminated into its characteristic impedance formed by a wedge-shaped plate 51 of resistive material (Figure 4) which may be a carbon element or a carbon-coated slab of dielectric substance, to prevent the formation of standing waves, which in most cases it is desirable to avoid. However, in certain cases where wide band operation is not essential standing waves could be employed to increase the sensitivity of the device.

The wave guide 46 lies parallel to plane Y—Z and, as is well known in the art of energizing wave guides, the outer conductor 52 of the line 41 is attached to the wave guide side face 48 and the inner conductor 52 terminates in an "antenna" or probe 54 which causes the electric field in the wave guide to vary in strength and in direction in synchronism with the detected signal, impressed alternating wave or similar impulse, the length of the probe being determined by known factors to secure a proper impedance match.

A sealing washer 54′ inserted within the coaxial line completes the seal for the envelope 44. To facilitate construction and to simplify the glass-to-metal sealing problem, the wave guide 46 may be enclosed entirely within the envelope 44 and only the transmission line 41, or any other type of conventional transmission line, sealed into and through the walls of the envelope in a manner to appear.

The wave guide end faces 49, 50 are provided with aligned rectangular entrance and exit slots 55, 56, respectively. As the length of the slots is an appreciable part of the lowest wave length covered by the device a path is provided for the transverse currents that flow in the narrow walls of the guide by covering the slots 55 and 56 either with a fine wire mesh or with transverse fine wires 55′ welded or otherwise secured at intervals of about one twentieth of the wavelength. In register with these slots and extending substantially coextensively with them are grids 57, 58 of foraminous material, grid 57 being more properly referred to as a target electrode having an electron pervious nature. Spaced from and coextensive with the slots is an elongated electron-emitting cathode element 59 of any conventional type commonly found in radio or cathode ray tubes.

A fluorescent screen 60 is positioned beyond the grid 57 and in the path of the electrons issuing from the wave guide exit slot 55 whereupon those electrons striking the screen in a manner to be explained form a spot display as shown in Figure 3. The screen 60 may be in the form of a coating on the laterally extending portion 44′ of the envelope 44, as in a cathode ray tube, or it may be placed upon a separate element.

The evacuated envelope 44 containing the arrangement thus far described is placed within a magnetic field that is constant in time but non-uniform in space, the nonuniformity being along the length of the cathode 59, for a purpose to appear, and is obtained by a pair of coils 61, 62 positioned at diametrically-opposite portions of the envelope 44. In place of this system of coils, permanent pole pieces or electromagnets, to be explained with reference to Figure 5, may be employed, in which case the faces of either or both pole pieces or of the magnets are tapered for a reason to appear. Electrons emanating from the cathode 59 are acted upon by the various fields existing in the tube to form a ribbon stream of electrons traveling from the cathode toward the target grid 57 having a length dimension parallel to the direction of flow and a width dimension perpendicular thereto in the plane including the elongated axis of the cathode.

To obtain the proper degree of angularity of the front coil 61 or the rear coil 62 relative to each other and the elements within the tube, any suitable means may be provided that would allow for the universal adjustment of such coils. In the embodiment shown in Figure 2 such means take the form of flexible arms 63, 64 which may be secured either to the envelope 44 or its base 45'. These flexible arms are twisted or bent to shift either coil into any desired plane. Where permanent or electromagnets are employed, the poles pieces may be similarly adjusted or one of the pole faces presented to the cathode may be tapered, the degree of taper being chosen to obtain the desired variation in magnetic flux. Although the coil 62 at the rear of the tube is shown as being tilted to obtain the requisite variation in the magnetic field, either coil or either pole face may be tilted without affecting the operation of the device.

Suitable potentials are applied to the various elements as shown in Figure 2, the cathode being maintained at the lowest potential; the accelerating grid 57, the waveguide 46 and the control grid 58 are at successively higher positive potentials with respect to the cathode 59. The relative magnitudes of these potentials and their relative order may be varied for different sized devices to suit various frequency ranges. As will appear further, either or both the control grid 58 and the accelerating grid 57 may be omitted if desired.

The display upon the fluorescent screen 60 may be viewed directly by an observer, the coil 61 offering no interference to his view. However, if pole pieces are utilized in place of the coils, a mirror plate 65 (Figure 5) is inserted for reflecting the pattern displayed upon the fluorescent screen 60 to the eye of an observer.

Figures 5, 10:
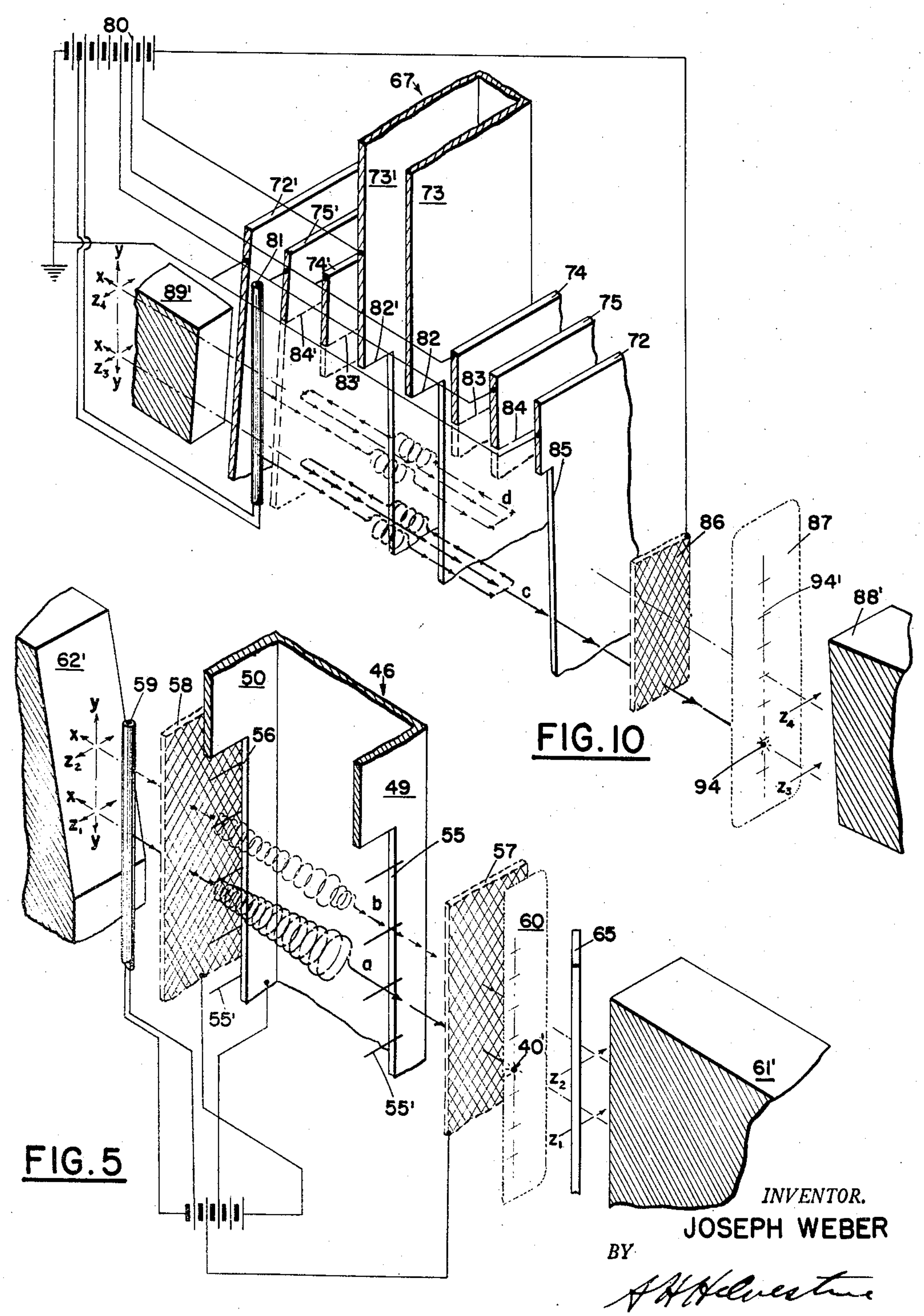
Figure 5 is an enlarged schematic view, as seen from line 5—5 of Figure 4, illustrating the respective paths of resonant and non-resonant charged particles, with the magnetic coils of Figure 4 being replaced by pole pieces for explanatory purposes.
Figure 10 is a view similar to Figure 5 but applicable to the construction of Figure 6 and viewed from line 8—8 of Figure 7.

In operation, electrons emanate from the heated elongated cathode 59 in a beam and flow past the control grid 58 into the entrance slot 56, moving across the waveguide 46 as schematically shown in Figure 5. To assist in the explanation, the coils 61 and 62 are replaced by their equivalent permanent pole pieces 61', 62' with one of the pole pieces 62' having a tapered face. A nonuniform magnetic field is thus created along the length of the cathode 59 which extends parallel to the Y axis. This field is similar to that formed by the tilted coil 62 and the coil 61.

As is well known in the art, the magnetic field created by the pole pieces 61' and 62' or coils 61, 62 exert a focusing action upon the electrons to cause them to move in definite paths of travel parallel to the axis of the magnetic field, the flux lines of which are parallel to the Y—X plane. Thus, all electrons leaving a point on the emitter 59 will come together at a point on the fluorescent screen 60. In addition, the magnetic field exerts a force on the electrons which is at right angles to both the direction of the magnetic field and the line of flow of the electrons causing each to travel in a path, the projection of which on a plane parallel to the Y—Z plane is a circle; the radius of this circular path being smaller the greater the strength of the magnetic field and the more slowly the electron moves through the field.

The relationship between the angular frequency of the electron in its circular path (or the time required to traverse the circular path) and the magnetic field is expressed by the well known equation $$f=\tfrac{1}{2}\left(\frac{e}{m}\right)\beta \text{ or } \omega=\left(\frac{e}{m}\right)\beta \qquad (1)$$

where $e$ and $m$ are the charge and the mass of the electron, respectively, and $\beta$ is the strength of the magnetic field formed by the coils 61, 62 or their equivalent pole pieces 61', 62'.

Thus, the movement or drift of the electron parallel to the axis of the magnetic field (that is, parallel to Y—X plane) and its motion in a circular path (parallel to Y—Z plane) combine to cause the electron to describe a helical path, such as schematically shown in Figure 5 by the paths $a$ and $b$, in traversing the wave guide 46. This helical path for the electron can be roughly compared to that traversed by an element on the leading edge of a propeller rotating parallel to the Y—Z plane while being simultaneously shifted along its axis of rotation parallel to the X axis.

Due to the focusing action of the magnetic field, all electrons emitted from the same spot on the electron-emitting element or cathode 59 and even though moving in the helical paths just described will converge at substantially the same point on the fluorescent screen 60 irrespective of their initial respective velocities.

By tilting the coils 61 and 62 relative to each other, as shown in Figure 2, or by tapering one of the pole pieces 62' in Figure 5, the magnetic field is made nonuniform along the axis of the cathode 59 as a result of which a progressively varying value for $\beta$ of Equation 1 is produced. Hence, for any cross section through a point on the cathode axis and parallel to the X—Z plane, such as $x^1$—$x^1$ or $x^2$—$x^2$ of Figure 5, there is a particular value of magnetic flux density $\beta$ which satisfies Equation 1. Consequently, for each cross section the electrons will rotate with different angular frequencies, that is, the time for an electron to traverse its circular path will vary from cross section to cross section along points on the element 59.

From Equation 1 it is also clear that the frequency range of the device is a function of the variation in strength of the magnetic field $\beta$ from one end of the element 59 to the other end. Therefore, for each electron circular path, already mentioned, the period of one revolution (time to complete one circular path) or angular frequency $f$ will be a function of the magnetic strength $\beta$ in accordance with the relationship set out in Equation 1 and will therefore differ for electrons moving in different levels or cross sections of the wave guide 46. Thus, in Figure 5, the value of $f_1$ for the electron occupying the path $b$ will be lower than $f_2$ of the electron following path $a$ for the reason that the respective values of the magnetic strength $\beta$ will be lower for path $b$ than for path $a$.

To analyze a complex alternating electromagnetic wave into its frequency components, the wave is fed from the amplifier 41' through the transmission line 41 and into the wave guide 46 wherein is set up an electric field, parallel to the Z axis (that is, perpendicular to the magnetic field) which varies in magnitude in time in accordance with the frequency of the wave.

If the frequency of any component part of the wave is equal to the angular frequency of an electron such as, for example, $f_2$ in cross section $x^1$—$x^1$ of Figure 5, the electron will accept energy on the average from the cyclically changing electric field within the wave guide due to the resonant condition existing between the frequency $f_2$ of the electrons and that of the wave component. This results in the resonant electrons being continuously accelerated along their circular paths, that is, the rotational velocity increasing with an expanding radius of the circular orbit, which coupled with the translatory motion of the electron parallel to the magnetic field results in the electrons travelling in a progressively expanding helix, such as schematically shown by path *a* of Figure 5, until the swirling electrons pass through the exit slot 55 into the region of the grid 57, which may be used to control the electron translational velocity in a manner to appear.

It can be shown that irrespective of the phase of the field of the alternating wave relative to the starting point of an electron in its movement in the circular orbit, the electron will begin to gain rotational energy when the conditions of rotational frequency $f$ and the strength of the magnetic field $\beta$ fulfill the requirements of Equation 1.

On the other hand, an electron emitted in a cross section, say $x^2$—$x^2$ of Figure 5, has a frequency $f_1$ determined by $\beta$ of Equation 1 and since this will not fulfill the resonant condition for the wave component, the electrons in this cross section will merely accept and release energy causing them to be accelerated and decelerated in larger and smaller orbits, following a path depicted diagrammatically by path *b* of Figure 5. These non-resonant electrons will also drift out of the wave guide and may strike the target screen in a manner to appear.

If a number of electromagnetic signals of different frequencies are present, electrons in different cross-sections of the guide corresponding to those frequencies will accept energy and resonate. All of the electrons flowing across the wave guide 46 have low translational velocities and, in addition, the resonant electrons will have rotational energies of the order of several hundred electron volts.

To convert the rotational energies of the resonant electrons into visual indications, such electrons are allowed to impinge upon a plate 60 coated with suitable fluorescent material, such as is found in the conventional cathode ray tube, to form visual traces giving a display of a series of discrete spots or dots 40' schematically shown in Figure 3. Instead of employing a separate plate 60 to support the fluorescent screen, the fluorescent material may be coated directly upon the glass envelope, thereby eliminating the need for the extra element.

When the electrons pass out of the waveguide through the exit slot 55 and impinge on the fluorescent screen 60, only the resonant electrons, which having acquired sufficient energy by absorbing it from the incoming wave, will on striking the fluorescent screen cause such screen to emit light to provide a visual indication not only of the presence of the signal but also of the frequency of the incoming signal. Most of the kinetic energy of the electron is released when it strikes the surface of the fluorescent screen. Although the largest components of velocity are tangential to the screen, the rough surface of the screen makes it possible for the tangential velocity components to excite the screen. Since the rotational electron-volt energy of the electrons is of primary importance in obtaining an indication on the screen 60, any translational energy added to the non-resonant electrons would tend to mask some of the weaker signals on the fluorescent screen. Therefore, the grid 57 is used to control the translatory movement of the electrons across the guide 46. The grid 57 is usually energized with a potential lower than that of the guide 46 but higher than that of the electron-emitting filament 59 aud the field formed by grid 57 (which somewhat penetrates the guide through slot 55) is used to retard the translational velocity of the electron through the wave guide 46.

The effect of the alternating electromagnetic wave upon the rotational velocity of an electron in its circular orbit is a function of the time period within which the electron is moving through the waveguide between the entrance slot 56 and the exit slot 55.

If the translatory velocity (that is, the drift motion) of the electron across the wave guide 46 is too great, the momentum of the electron will carry it through the wave guide before it can be appreciably affected by the alternating wave to change the rotational velocity of a resonant electron in its circular orbit. It is essential, therefore, that the electron be subjected to the alternating field, produced by the electromagnetic wave descending the wave guide, for an appreciable period of time in order that resonant electrons can build sufficient velocity of rotation before the electron strikes the fluorescent screen. In other words, the longer the time interval in which the alternating field affects the rotation of the electron the greater will be the ratio of the ultimate rotational velocity of the resonant electrons relative to the non-resonant electrons, causing the radius of the orbit of the resonant electrons to be greater relative to that of the non-resonant electrons. With the rotational velocity of the resonant electrons being greater than that of the non-resonant electrons, their energy will be greater and therefore their affect on the fluorescent screen will be proportionately greater.

Hence, the resonant electrons will have their rotational velocity (orbital speed) accelerated to a degree such that they will strike the fluorescent screen with sufficient energy to cause a visual trace. On the other hand, the rotational velocity of the non-resonant electrons cannot be built up so that when they drift through the exit slot 55 of the waveguide they will strike the fluorescent screen without the required magnitude of energy to cause any indication. It is well known that phosphors, forming a coating for a fluorescent screen 60, will not be excited when struck by an electron having energy below a certain threshold value. As the total energy of a non-resonant electron can be made to be always below this threshold value, it will not excite the phosphor of the screen.

Therefore, to increase the translatory drift through the wave guide 46, the long dimension of the waveguide, parallel to plane X–Y, may be increased to maintain the drift of the electron in the wave guide within the required time interval. As this would, however, require the envelope to be of large dimensions, variations of the grids 57, 58 are instead employed.

The grids 57, 58, suitably energized by direct current potentials, control the translatory drift of the electron across the wave guide between the entrance slot 56 and the exit slot 55. The potential selected for the wave guide is between the voltages selected for the grids and these voltages can be suitably varied to obtain the desired electron drift through the wave guide. However, either or both grids may be omitted without affecting the basic operation of the device.

Only those electrons, therefore, resonant with a radio frequency wave or its component will acquire sufficient electron-volt rotational energy to produce a visual trace on the fluorescent target while those not resonant will not have the requisite energy to produce any screen light when they hit the fluorescent screen.

The ability of the device to discriminate between closely related or adjacent frequencies is a function of the drift and therefore by maintaining the drift of the electrons in the waveguide sufficiently low, the resonant electrons are able to gain the requisite degree of rotational velocity over the non-resonant electrons to effect an increase in the resolution of the device.

In the embodiment of Figure 2, and for a wave length of, for example, 10 centimeters, a magnetic field of about 1,000 gauss is required. As the resolution of the device is directly proportional to the length of time the electrons are in the wave guide, a cross-section of 0.5 by 8 centimeters is satisfactory. With a power level of 1 watt for a given incoming signal, resonant electrons will acquire about 200 electron volts of rotational energy. With the translational energy of all electrons not exceeding 10 electron volts and the transit time across the guide being not less than $\frac{1}{25}$ of a microsecond, a resolution of the order of 1% can be obtained. The size of the spot 40' will vary with the energy acquired by the electron during its orbital motion as it describes the helix of path *a* (Figure 5). In the wave guide of the size mentioned, resonant electrons may acquire as much as 300 electron volts of rotational energy which upon striking the fluorescent screen 60 will produce a spot 40′ approximately the size of 1 millimeter, with the radius at the large end of the helix being approximately 1 millimeter whereas that for the non-resonant electrons will be in the order of $10^{-3}$ millimeters.

The position of the spots 40′ along the scale 60′ etched on or along the fluorescent screen 60 indicates the frequencies of the wave components present in the wave guide 46.

Due to the magnetic field being non-uniform along the cathode axis, the lines of flux will be curved rather than flat. However, irrespective of this condition, the focusing action of the magnetic field will result in the charged particles leaving any given point on the emitter 59 to arrive eventually at a given point on the fluorescent screen 60.

Although the electric field is formed by the wave guide 46 within the evacuated envelope 44, this electric field, like the magnetic field, can be formed outside the envelope without altering the basic functioning of the device. In such cases the electron-emitter 59, grids 57, 58 (when employed) and the fluorescent screen 60 are enclosed within a smaller evacuated envelope and this envelope inserted into the wave guide which may be either of rectangular cross section or may consist merely of a pair of parallel plane surfaces such as the wave guide side faces 47, 48.

Many other arrangements are possible for this particular embodiment, all of which have in common electron translational motion parallel to magnetic lines of force and only a time varying signal electron field present in the interaction space. Many types of wave guiding configurations can be used and any method of producing the electrons may be employed.

Figure 6:
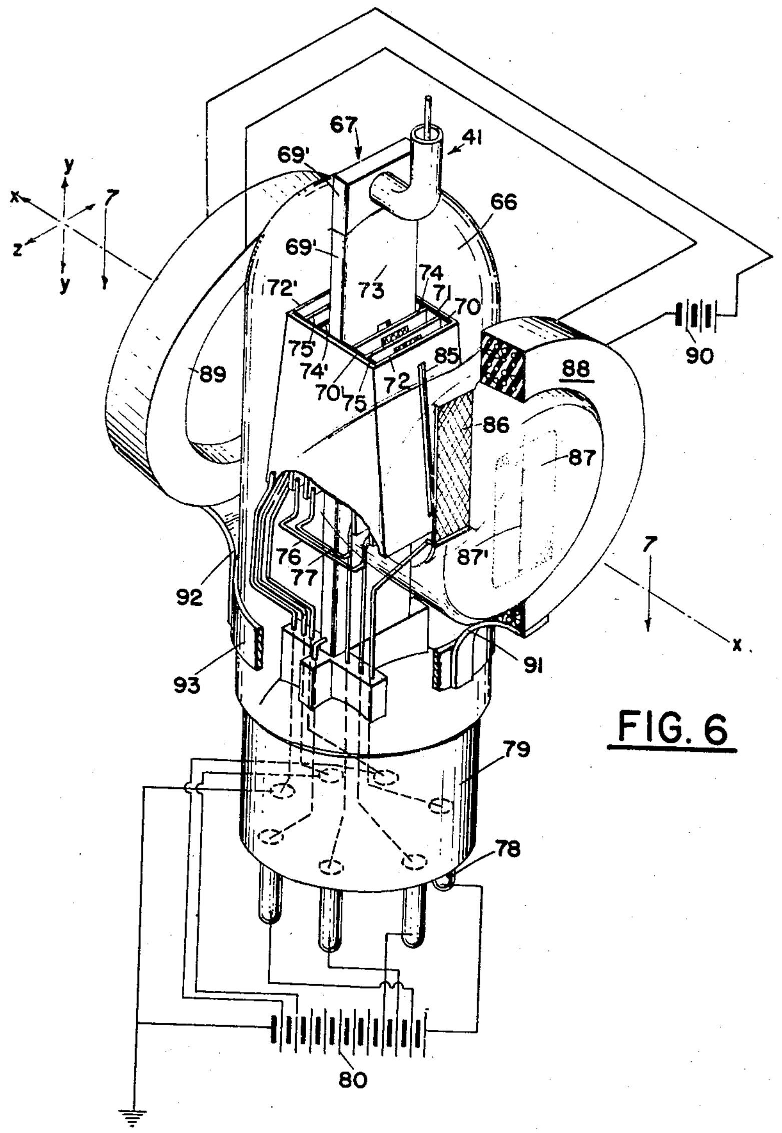
Figure 6 is a perspective view of an embodiment of the invention employing a uniform magnetic field.

A modification of the frequency analyzer employing a magnetic field uniform in space and constant in time and a strong electric field parallel to the magnetic field and constant in time on which is superimposed the alternating wave to be analyzed is shown in Figure 6 wherein an evacuated envelope 66, similar in shape to 44 of Figure 2, contains a waveguide 67. As in the case of the previous embodiment, the wave guide 67 is hermetically sealed into and through the walls of the glass envelope and receives the complex alternating wave or signal to be analyzed through the coaxial line 41 from either the amplifier 41′ or other source.

The wave guide 67 is terminated in its characteristic impedance in the form of a wedge-shaped plate 68 (Figure 8) of resistive material similar to 51 (Figure 4) and for a like purpose.

Figure 8:
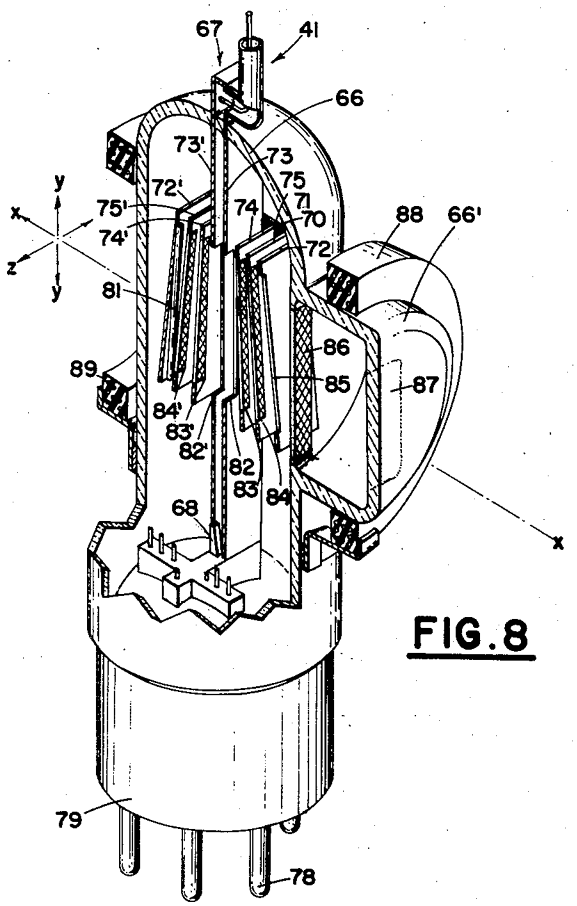
Figure 8 is a perspective view of Figure 6 with certain portions broken away to show the internal construction.
Figure 7:
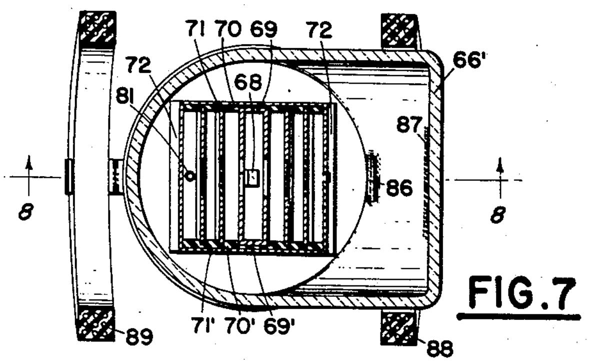
Figure 7 is a transverse cross section as seen from line 7—7 of Figure 6.

Attached to the wave guide end faces 69, 69′ (Figure 7), which are parallel to the X—Y plane, are sheets 70, 70′ of suitable insulating material on which are bonded trapezoidal side plates 71, 71′. These side plates are symmetrically arranged relative to the waveguide 67 and in turn are integrally united with end plate electrodes 72, 72′ to form a tapered box-like structure. Spaced between the waveguide side faces 73, 73′ and the end plate electrodes 72, 72′ are a number of intermediate plate electrodes 74, 74′ and 75, 75′ which are rigidly maintained in their spaced relationship by being embedded in the insulating material 70, 70′. As indicated in Figure 8, the spacing between the upper portions of the plate electrodes is less than that at the bottom portions for reasons to appear, as a result the plate electrodes on both sides of the waveguide are inclined toward the wave guide with equal angularity. Thus, corresponding plates, such as for example, 72, 72′ lie in planes which when extended intersect the wave guide in a common line lying in the central longitudinal plane of the wave guide. The corresponding plates 74, 74′ likewise lie in planes which when extended intersect the wave guide central longitudinal plane but at a distance above the line of intersection of plates 72, 72′. Similarly, corresponding plates 75, 75′ are likewise inclined. In certain instances in order to obtain different electric field potential gradients, these lines of intersection may be below or coincide with each other.

Although the various plate electrodes are inclined upwardly of and toward the wave guide 67 (Figure 8), their inclination may be reversed so that they are inclined downwardly of and toward the waveguide 67 without affecting the operation of the device, with the exception that the direction of the index markings of Figure 3 would now be reversed so that the higher frequency reading is at the bottom of the scale instead of the top.

Corresponding pairs of plate electrodes on each side of the wave guide 67 are connected together to form equipotential surfaces for a purpose to appear. Thus, end plate electrodes 72, 72′ are united together through side plates 71, 71′, plate electrodes 75, 75′ are connected together by cross lead 76, and plate electrodes 74, 74′ by cross lead 77. The connections may also be made externally of the envelope 66.

The cross leads 76, 77 are suitably connected to base prongs 78, carried by base 79, which in turn are adapted to be connected to direct current potentials, as schematically illustrated in Figure 6, obtained from a suitable source such as a battery 80.

Interposed between the end plate electrode 72′ and the intermediate plate electrode 75′ is an elongated electron-emitting element 81 arranged substantially parallel to the wave guide 67. The element 81 may be any conventional type of electron-emitting material commonly found in radio or cathode ray tubes.

The wave guide side faces 73, 73′ are provided with aligned slots 82, 82′ which extend coextensively with the element 81. The plate electrodes 74, 74′, 75, 75′ and 72 are likewise provided with aligned slots 83, 83′, 84, 84′ and 85 respectively. The slots with the exception of 85 in end plate electrode 72 are approximately of the same length and width. The slot 85 of end plate electrode 72, is smaller for a purpose to appear.

Spaced beyond the end plate electrode 72 and in the laterally extending portion 66′ of the glass envelope is an accelerating grid 86, in register with the slot 85, and formed on the walls of this portion 66′ is a fluorescent screen 87. The emitter 81, the accelerating grid 86 and the fluorescent screen 87 lie in planes substantially parallel to the Y—Z plane.

The spacing between the upper portions of the plate electrodes and that between the lower portions of the plate electrodes relative to each other and the wave guide are correlated with the potentials applied to these electrodes such that a parabolic potential field is set up between plate electrodes 72 and 72′.

For purposes of illustration and to further an understanding of the operation of the device, assume that it is to be used for determining the frequency components in the radio frequency spectrum between 1500–750 mcs.

The spacing between the individual plate electrodes and the wave guide 67 at the upper end is such that the variation of potential (potential gradient) between any two plate electrodes, and between the wave guide and the adjacent plate electrodes, is linear with distance, but a parabolic law for the entire device is approximated by spacing the plate electrodes and the wave guide relative to each other and applying to them respective potentials corresponding to a parabolic curve A (Figure 9) in which voltage is plotted against distance in accordance with the equation $$V=C-\tfrac{1}{2}kX^2(10^{-4}) \qquad (2)$$

wherein $V$=voltage on a plate electrode or guide $C$=a constant (numerically equal to the potential on the wave guide which in the present case is 25,300 volts)

$k$=a force constant which is a function of the frequency $f$ and determined to be $50.5\times10^7$ at 1500 mcs. and $12.6\times10^7$ at 750 mcs. from the equation $$f=\frac{1}{2\pi}\sqrt{k\frac{e}{m}}$$

$X$=distance between a wave guide side face and a plate electrode in centimeters $10^{-4}$=a conversion factor to obtain distance X in centimeters.

It will be noted from the curve A (Figure 9) that the voltage may be varied in equal steps resulting in unequal spacing between the plate electrodes and the wave-guide, or the distances between the plate electrodes may be made equal and the voltages at the plate electrodes varied in unequal steps.

However, for the present illustration, the spacing between the upper edges of the plate electrodes and the wave guide is made equal.

For a distance X of ⅓ cm. between the wave guide side face 73 and the top edge of plate electrode 74, and with a voltage on the wave guide 67 of approximately 25,300 volts, the voltage necessary for plate electrode 74 is obtained from Equation 2 by substituting the known values as follows:

$$V=25{,}300-\tfrac{1}{2}\times50.5\times10^7\times(\tfrac{1}{3})^2$$
$$V=22{,}500$$

The distance X between the wave guide side face 73 and the top edge of the plate electrode 75, therefore, is ⅔ cm. and the voltage required for plate electrode 75 is found by a similar calculation to be 14,050 volts and for plate electrode 72, 0 volts.

The spacing of the bottom edges of the plate electrodes at the bottom of the envelope is likewise determined from Equation 2. However, at 750 mcs., the force constant $k$ has the value of $12.6\times10^7$ and Equation 2 is now represented by the lower parabolic curve B of Figure 9. Substituting the voltage values already obtained on curve A and the new value $12.6\times10^7$ for $k$ in Equation 2, the desired distance from the wave guide side face 73 and the bottom edge of plate electrode 74 is determined from $$22{,}500=25{,}300-(\tfrac{1}{2})(12.6\times10^7)(X^2)$$
$$\tfrac{2}{3}\text{ cm.}=X$$

The distance between the wave guide side face 73 and the plate electrode 75 is likewise determined to be $$14{,}050=25{,}300-(\tfrac{1}{2})(12.6\times10^7)(X^2)$$
$$\tfrac{4}{3}\text{ cm.}=X$$

The distance for the plate electrode 72 is similarly determined to be $$0=25{,}300-\tfrac{1}{2}(12.6\times10^7)(X^2)$$
$$2\text{ cm.}=X$$

Figures 9, 18:
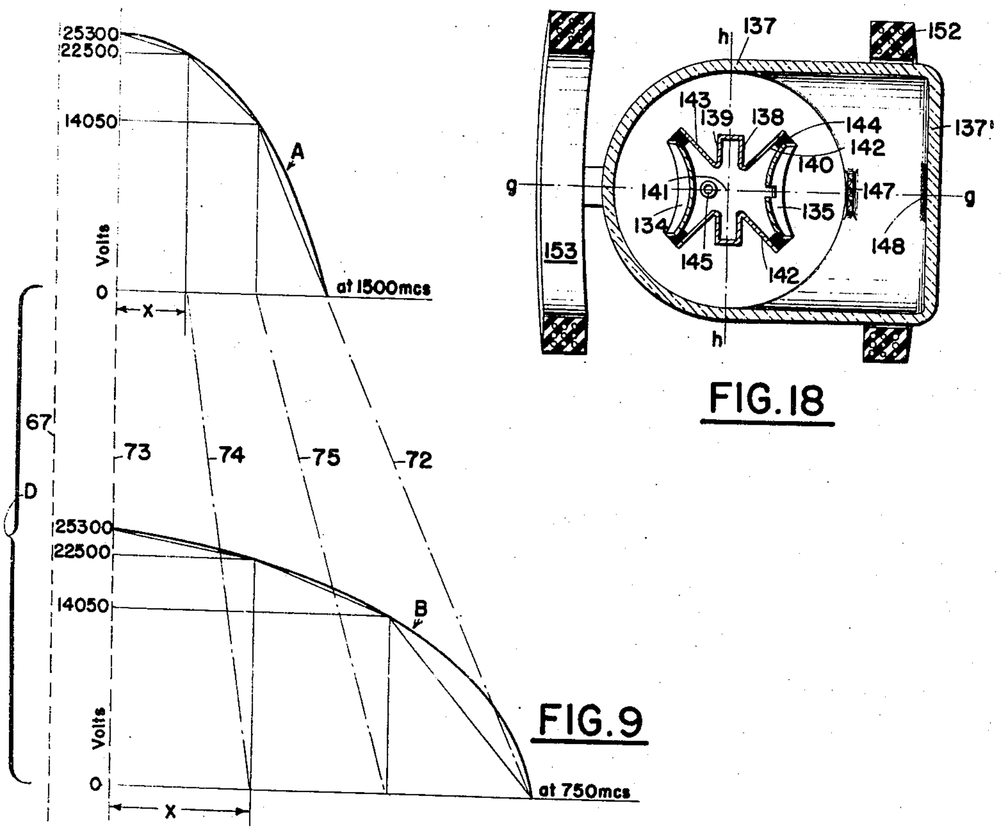
Figure 9 shows the relationship between the energizing potentials on the various electrodes and the relative spacing between the same.
Figure 18 is a transverse cross section through line 18—18 of Figure 17.

The voltages on the plate electrodes and the wave guide 67 as well as the respective distances X between the upper edges of the plate electrodes and the lower edges of said plate electrodes relative to each other and the wave guide 67 may be plotted as shown in Figure 9, thereby arriving at the angularity of the plate electrodes. The distance D between the abscissas at 1500 mcs. and at 750 mcs., respectively, is not critical, such distance merely affecting the resolving power of the device in portraying the component frequencies on the fluorescent screen 87, as will appear more clearly with reference to Figures 11 and 12 to be explained.

Although Figure 9 has been identified with plate electrodes 74, 75 and 72, the identical procedure is applicable to the plate electrodes 74', 75' and 72'. Where the plate electrodes 74', 75' and 72' are identically spaced from the wave guide like their respective counterparts 74, 75 and 72, they are connected in pairs by the cross leads 76, 77 to form equi-potential surfaces.

The evacuated tube 66 containing the arrangement so far described is placed within a magnetic field which is constant in time and uniform in space along the length of the emitter 81 (Y axis). The magnetic field is so located that its flux is substantially perpendicular to the plate electrodes and the wave guide.

The magnetic field is produced by coils 88 and 89 suitably energized by a source 90 of direct current. The coils may be supported by flexible arms 91, 92 of a bracket 93 embracing the tube 66. The field so provided is substantially uniform in space along the Y axis and constant in time. The flexibility of the arms 91, 92 provides the means for adjusting the coils 88, 89 relative to each other and the plate electrodes in order that the lines of flux will flow in a path to cut the plate electrodes and wave guide in a direction substantially normal to each.

While the magnetic field exerts no force on the electron stream travelling parallel to the flux lines, it provides a focusing action for the electrons emitted from the emitter $81_2$ as explained with reference to the embodiment of Figure 2, as in that embodiment, permanent magnets 88', 89' (Figure 10) may be substituted for the coils 88, 89.

Where permanent or electromagnets are employed the faces presented to the envelope are slightly tapered (Figure 10), the degree of taper being chosen to obtain substantially the perpendicular relationship between the magnetic flux and the plate electrodes and wave guide.

The emitter 81, which may be directly or indirectly heated without affecting the operation of the device, receives its energy at an appropriate voltage somewhat higher than that of the end plate electrodes 72, 72'. The emitter 81 is the source of electrons which, due to the voltages on the respective plate electrodes, are caused to oscillate about the wave guide 67 as a center such that any force returning the electrons to this center position is approximately proportional to the displacement of the electrons from such point. As a result of such action, the electrons execute simple harmonic motion, the period being independent of the amplitude of the excursions.

As explained with reference to the embodiment of Figure 2, the electrons from the emitter 81 move parallel to the magnetic flux (parallel to X—Y plane) due to the focusing action of the magnetic field and also traverse a circular path (parallel to the Y—Z plane). These movements combine to make each electron describe a helical path, as diagrammatically shown in Figure 10 by the paths $c$ and $d$, in traversing the interaction space between the end plate electrodes 72, 72'. However, in this embodiment, and thus in this respect differing from that of Figure 2, the movement of the electron in its circular orbit (parallel to plane Y—Z) is not an important factor in the operation of the device and, therefore, for explanatory reasons this circular motion can be disregarded and the motion of each electron visualized as being in a linear path from the emitter 81 to the fluorescent screen 87.

The tilt of the plate electrodes relative to the wave guide 67 provides a non-uniform electrostatic field, progressively varying along the axis of the emitter 81. Therefore, for any cross section normal to the emitter axis, such as for example $Z^3$—$Z^3$ or $Z^4$—$Z^4$ of Figure 10 (parallel to the X—Z plane) the electrostatic field has a particular value determined by the potentials on the electrodes and the wave guide and the spacing between these parts at the cross section (Figure 9). For explanatory purposes, consider those electrons being emitted from a point on 81 in the plane $Z^3$—$Z^3$ (Figure 10). These electrons will be accelerated toward the positive plate electrode 75', and upon reaching it some will hit the plate 75', delivering all of its energy to it, while the remaining electrons, due to their acquired momentum, will pass through the slot 84' (or the space between the grid wires where such are used to cover the slots) into the region between the plates 75' and 74' whereupon the electrons will be further accelerated toward the plate electrode 74' since it is at a higher positive potential than that of plate 75'. Some of these latter electrons will now strike plate 75' and the remainder will pass through the slot 83' into the region between the plate electrode 74' and the wave guide side face 73'. Hence, again, the remaining electrons are given a further boost in acceleration by the side face 73' which is at a higher positive potential than that of the plate electrode 74'. Those electrons not striking the side face 73' enter through slot 82' into the wave guide 67 itself.

During the passage of the electrons from the emitter 81 into the wave guide 67, the electrons have acquired momentum of sufficient magnitude to cause them to shoot through the wave guide into the electrostatic fields between the remaining plates on the other side of the wave guide. However, on passing through slot 82 of the wave guide side face 73, the electrons are subjected to a repelling action by the plate 83, which is less positive than the wave guide 67, resulting in the electrons being decelerated in the region between side face 73 and plate 83, the electrons delivering their energy to the electrostatic field in this region. However, this deceleration is not sufficient to stop the movement of the electrons, some of which will strike the plate 74 and be absorbed thereby and the remainder will pass through the slot 83 into the region between the plates 74 and 75, whereupon the electrons are still further decelerated, the plate 75 being less positive than 74. However, the remaining electrons still have sufficient momentum to carry them through the slot 84 toward the plate electrode 72. In the region between the plates 75 and 72, however, the electrons that pass through the slot 84 will be rapidly decelerated and upon reaching a position adjacent plate 72, they will be deflected in the opposite direction (to the left in Figure 10) and re-accelerated back through the wave guide 67. After passing through the wave guide 67 on this return trip, the electrons will be decelerated by the plates 74', 75' and 72'. Upon reaching a region between plates 72' and 75' the electrons will be accelerated in their original direction.

This action of the electron can be compared to the simple pendulum, with the electron acting like a concentrated mass at the end of a cord of negligible weight, with one end of the cord firmly anchored to the top or closed end of the wave guide 67. When the mass is pulled over to the position of the emitter 81 and released, it is accelerated toward and travels past the wave guide after which the mass will come to rest for an instant and then retraces its path, swinging back and forth past the wave guide until its energy is dissipated, the restoring force on the mass being directly proportional to its displacement making the motion of the mass harmonic.

The electron has a similar simple harmonic motion in which the greater the displacement from the wave guide 67, the greater the restoring force, the varying potentials on the plates and the spacing of the same acting similar to gravity in the case of the pendulum, this in turn controlling the period or frequency of oscillation of the electron. The amplitude of the excursions is governed by the initial potential energy of the electrons with respect to the wave guide 67 which in turn is determined by the potential drop between the emitter 81 and wave guide 67.

As in the case of the pendulum, the amplitude is independent of the period or frequency. Thus, the electrons will make excursions back and forth in plane $Z^3$—$Z^3$ in a harmonic manner, with a frequency dependent upon the respective voltages on the plates and wave guide and their relative spacing. In other words, the frequency is determined by the time consumed by an electron in travelling from the region between the plate electrodes 72' and 75' to the region between the plate electrodes 72 and 75 and back again to its starting point.

When an alternating wave signal is impressed upon the wave guide 67 from the transmission line 41, an electric field is set up within the wave guide 67 between the side faces 73 and 73' varying in time in accordance with the frequency of the signal. Therefore, the alternating voltage of the signal is superimposed upon the direct current voltage of 25,300 volts and as one of the side faces of the wave guide, say side face 73, becomes more positive, as a result of the alternating voltage, at the instant that an electron, has entered slot 82' and is moving toward that side face, the energy of the electron will be increased. Likewise, if the polarity of the alternating voltage has changed at the instant the electron is moving in the opposite direction toward the other side face 73', the electron will be accelerated further, this time toward the side face 73' and will again gain in energy and velocity as it moves through the slot 82' toward the plate electrodes. This acceleration of the electron will continue as long as there is an in-phase component of the alternating voltage with respect to the motion of the electron.

This is analogous to the pendulum which when in oscillation receives an impulse in the direction of its swing and if the periodicity of the impulses is such that they occur always during the direction of its swing, the amplitude will become larger and larger (but the period of vibration remains the same).

As long as the alternating voltage of the signal is in phase with the translatory movement of the electron through the wave guide, it will continue to gain energy and will acquire sufficient energy and velocity to overcome the decelerating effect of plates 74, 75, 72 to project itself through the slot 85 of end plate electrode 72 into the region of the accelerating grid 86, as depicted by path *c* (Figure 10). The accelerating grid 86 being at a higher potential than that of the plate 72 will accelerate the projected electron to cause it to strike the fluorescent screen 87 with sufficient force to create a visual trace 94 thereon.

When the signal frequency falls outside of the assumed range of 1500–750 mcs. or when it is not in resonance with the electron frequency of the electrons vibrating in plane $Z^3$—$Z^3$, the average linear velocity of the electron across the wave guide will either be not affected or be decelerated by the opposition of the off-resonance electric field within the wave guide 67 such that its momentum becomes insufficient to force it through a slot of a plate electrode whereupon the electron will be ultimately absorbed by a plate. Path *d* (Figure 10) depicts diagrammatically the action of an electron having a frequency not in resonance with that of the impressed signal. This likewise is analogous to the swinging pendulum which receives impulses gradually becoming out of phase and against the direction of its swing, resulting in the amplitude of the pendulum becoming smaller and smaller until it stops.

Thus, the out-of-resonant frequency component will not for all practical purposes affect average energy and velocity of the electrons whereas the in-resonant components will accelerate the electrons to such a degree that they acquire sufficient energy to project themselves through the slot 85 in the end plate electrode 72 whereupon the accelerating grid or target 86 takes control to further accelerate the electrons sufficiently to strike the fluorescent screen 87.

Due to the inclination of the plate electrodes, the strength of the electrostatic field for each cross section parallel to the X—Z plane (like $Z^3$—$Z^3$ and $Z^4$—$Z^4$) is different, the strength varying progressively from the top of the device to the bottom. As the cyclic rate of oscillation of the electrons for each cross section is a function of the strength of the electrostatic field of that cross section, the oscillation frequency of the electrons for each cross section will likewise vary.

Any signal frequency imposed on the wave guide 67 will affect only those electrons in a particular cross-sectional area having an excursion frequency equal to that of the signal frequency. The electrons so affected will then be projected out through the slot 85 and accelerated by the grid 86 against the fluorescent screen 87 to form a visual trace, the position of which along the base line of the scale 94' being indicative of the frequency detected.

If a signal frequency having more than one frequency component is present or if a number of individual signals are fed into the wave guide 67, those electrons oscillating in the cross-sectional areas parallel to the X—Z plane and in resonance with the frequency components present will be projected against the screen 87 as visible indications 94 at spaced points along the length of the base line 94' on the screen, the distance along this line being proportional to the frequency components detected.

Therefore all the frequency components of any alternating wave applied to the wave guide will be indicated, it being understood of course that the base line is calibrated by applying known frequencies to the device.

It can be shown that irrespective of the phase of the electric field in the wave guide, due to the alternating signal, relative to the starting point of an electron in its back-and-forth excursion with simple harmonic motion, the electron will begin to gain translatory energy when the harmonic frequency is equal to the frequency of any component of the alternating signal.

The device will function as well on odd harmonics as well as on the fundamental frequency of a signal.

If the same electrode spacing is used and the same potential on the plates is maintained, the device can be used to detect harmonics at 4500 mcs., 7500 mcs. and 10,500 mcs. etc. providing suitable band pass filters are employed ahead of the device to pass only the band of frequencies which it is desired to display.

The advantage of using harmonics is that for a given frequency the voltages required are less or the spacings are greater. For example, the 1500–750 mcs. device can be used to detect the 4500–2250 mcs. band components without changing any of the structures or potentials, if a 4500–2250 mcs. band pass filter is employed.

If filters were not employed or no change made in the long dimension of the wave guide and operation was desired on the fundamental with the electrons oscillating at a 4500 mcs. frequency rather than 1500 mcs., the voltages required for the same electrode spacing would be 9(25,300) or 227,700 volts, a prohibitively large value. However the same voltage (25,300 volts) could be used if the electrode spacings were reduced to 1/9 of their original value. The operation of the device on harmonics is entirely analogous to the motion of a pendulum which is kept swinging by striking it every third half swing or fifth half swing or $(2n+1)$th half swing.

The length of each plate electrode is not critical but is made of any reasonable dimension to allow for an adequate visual display of the electrons striking the target. If the distance D (Figure 9) between the top and the bottom edge of each plate electrode is made relatively short, the display on the screen 87 for a given range will be "bunched" up, making it difficult to distinguish between the discrete individual traces.

To "spread" these individual indications over a large area, to obtain "band-spread" so to speak, of the visual traces the distance D can be increased to any reasonable amount without requiring any change in the potentials applied to each plate electrode, the relationship between plate spacing and polarizing potentials remaining as depicted in Figure 9.

Figures 11, 12:
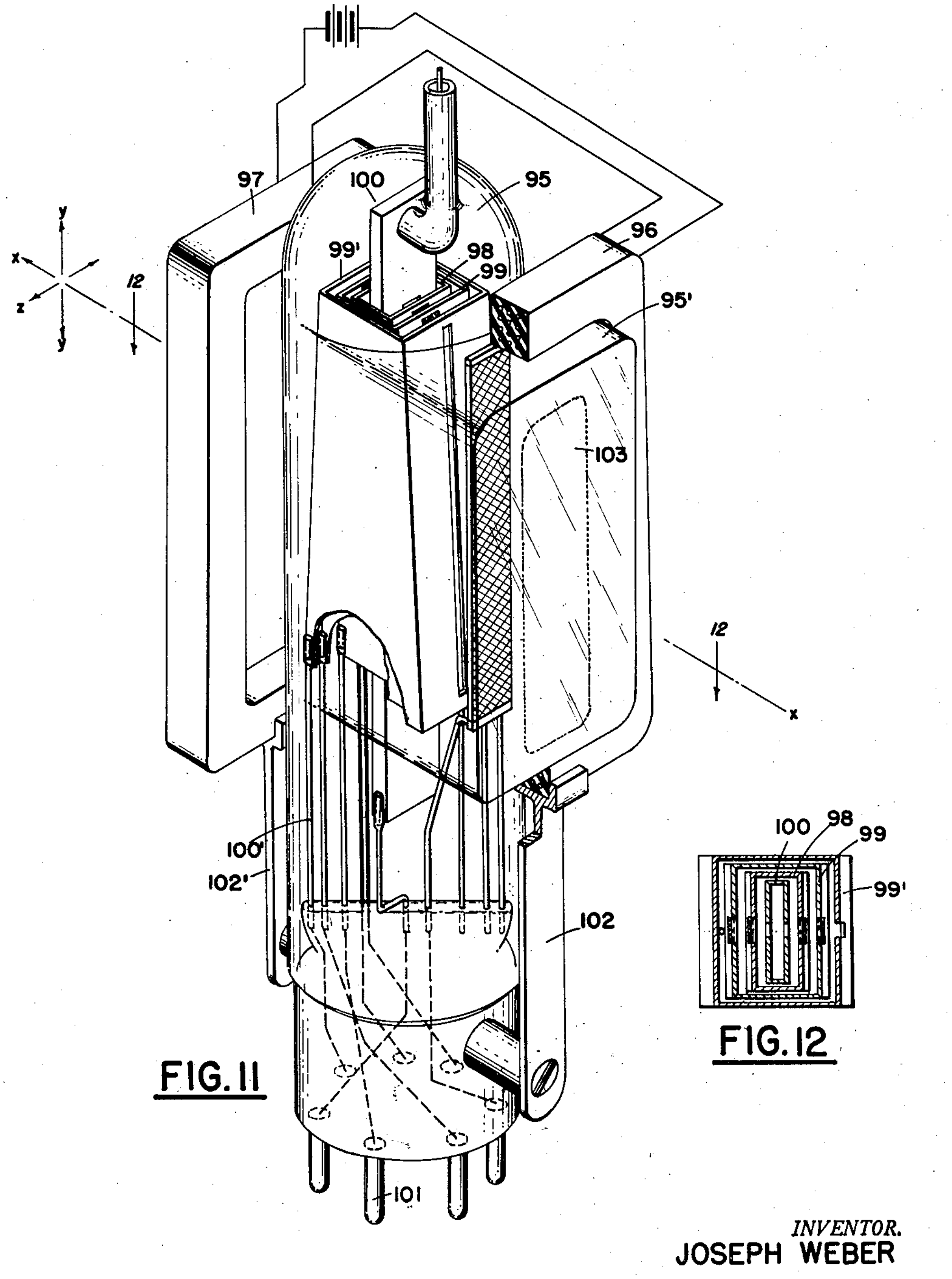
Figure 11 is a perspective view of an alternative form of construction of the device of Figure 6.
Figure 12 is a transverse cross sectional view as seen from line 12—12 of Figure 11.

An embodiment in which the distance D (Figure 9) is increased is shown in Figures 11 and 12. In addition to lengthening the plate electrodes, other structural changes have been incorporated to indicate the various features of the device of Figures 6, 7, 8 that can be modified without affecting the operation of the device. Thus, to accommodate the elongated parts, the envelope 95 is lengthened. Instead of circular magnetizing coils 88, 89 as in Figure 6, and further to conserve space due to the elongation of the projecting tube portion 95', the coils are formed into rectangular windings 96, 97. Each pair of plate electrodes, such as 74, 74' and 75, 75' (Figure 6) forming the equipotential surfaces, instead of being imbedded in insulating material 70 or 70' are now formed as tapered sleeves 98 and 99, respectively, concentrically arranged about the wave guide 100 (Figure 12). The sleeves and the wave guide are supported at diametrically opposite points in the envelope by rod elements 100' which also form the electrical connections to the appropriate base prongs 101. The adjustable arms 102, 102' function in the same manner as their equivalents 91, 92 of Figure 6. The accelerating grid 102 and the screen 103 are elongated to accommodate the lengthened plate electrodes. The wave guide 100 is wholly within the envelope 95 but the transmission line 41 is sealed into and through the walls of the envelope. Notwithstanding these structural differences, the tube devices of Figure 6 and 11 operate alike.

Figure 13:
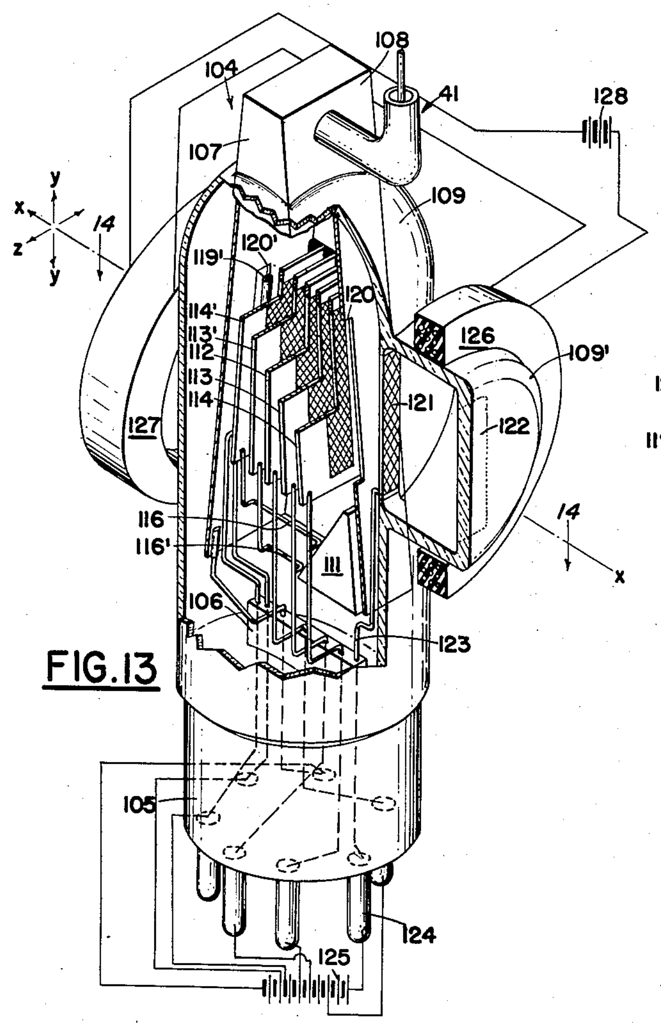
Figure 13 is a further modification of the embodiment shown in Figure 6.
Figure 15:
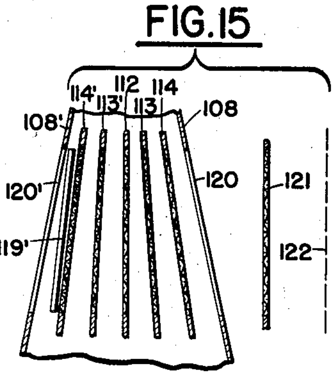
Figure 15 is a partial cross sectional view through line 15—15 of Figure 14.
Figure 14:
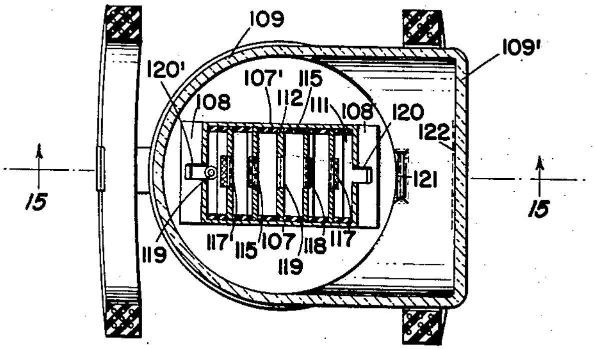
Figure 14 is a transverse cross section viewed from line 14—14 of Figure 13.

In the embodiment of Figures 13, 14 and 15, the parabolic electrostatic field is created within a tapered wave guide 104, differing from that of the species of Figures 6 and 11 in that the respective wave guides 67 and 100 are centered within their respective electrostatic fields.

Carried by a base 105 is a stem 106 and extending upwardly above it is the wave guide 104 formed from parallel end faces 107, 107' and inclined side faces 108, 108' whereby the cross section through any portion of the wave guide 104 is of rectangular shape as shown in Figure 14.

The wave guide 104 is hermetically sealed into and through the walls of an envelope 109 and connected to the transmission line 41. As explained with reference to the previous embodiments, the wave guide 104 may be totally enclosed by the envelope 109, leaving only the transmission line 41 protruding through the envelope and sealed into and through its walls, or the seal may be formed as shown in the top of Figure 2.

The wave guide 104 may be terminated in its characteristic impedance in form of a wedge-shaped plate 111, as in the previous embodiments for a similar purpose.

Lying in the longitudinal medial plane of the wave guide 104, and thereby equidistant from its inclined side faces 108, 108', is a central plate electrode 112.

Positioned between these side faces 108, 108' and the central plate electrode 112 are inclined intermediate and end electrodes 113, 113' and 114, 114', respectively. These plate electrodes are rigidly maintained in their spaced relationship by suitable insulating material 115 functioning similar to the material 70 of Figure 6.

The spacing between, and the angularity of, the individual plate electrodes themselves and the wave guide side faces 108, 108' is determined by curves A and B of Figure 9 as is done for the embodiment of Figure 6 utilizing Equation 2, with the exception that the polarizing voltage ordinates, instead of being referred to the wave guide, are now referred to the central plate electrode 112. Thus, the constant C of Equation 2 is made equal to the polarizing voltage applied to the central plate 112 which, for the assumed frequency range of 1500–750 mcs., is taken as 25,300 and the distances X are measured from the central plate electrode 112 instead of from the wave guide as is done in the embodiment of Figure 6.

Corresponding plate electrodes are connected together by cross leads 116, 116' to form equipotential surfaces. The electrodes are provided with slots 117, 117', 118, 118' and 119 aligned and extending extensively with an elongated cathode 119' interposed between one of the plate electrodes 114' and a side face 108' of the wave guide 104 and substantially parallel to the central electrode 112. The wave guide side faces 108, 108' are likewise provided with similar slots 120, 120'.

As in the previous embodiments, there is spaced beyond the side face 108 of the wave guide and in the laterally extending portion 109' of the glass envelope 109 an accelerating grid or target 121 and a fluorescent screen 122.

Wire elements 123 connect the plate electrodes and the wave guide to their respective base prongs 124 which in turn are adapted to be connected to appropriate voltages obtained from any suitable source such as the battery 125. Circular coils 126, 127, suitably energized by a direct current source 128, provide the magnetic focusing field.

The explanation of the operation of the embodiment of Figure 6 is applicable to the embodiment of Figure 13. However, as the wave guide 104 now forms the outside shell for the plate electrodes, instead of being centrally located with respect to the plate electrodes, the embodiment of Figure 13 will function only with the fundamental frequency components of a complex wave whereas the embodiment of Figure 6 can function with the fundamental and harmonic frequency components of the complex alternating wave. This is because in the embodiment of Figure 13 the radio frequency field acts on the electrons during the entire period of their swing instead of only during the central portion of the swing as in the previous embodiments. It can be shown mathematically that in this case no harmonic operation is possible.

Within the wave guide 104 there is created a resultant electric field formed by a direct current polarizing potential from the source of energy 125 and by the radio frequency energy of the signal wave being analyzed. That is, the varying potential of the radio frequency energy is superimposed upon the direct current biasing potential of the wave guide 104 which in turn causes the resultant electric field within the wave guide to fluctuate with the frequency components forming the radio frequency energy propagated down the wave guide. Electrons from the cathode 119′ are introduced into the parabolic field formed within the wave guide 104 where they move with simple harmonic motion. Electromagnetic signal wave energy moves down the tapered wave guide in a direction parallel to the Y—X plane to react with the oscillating electrons and those electrons having periods similar to the signals and in phase therewith pick up energy from the electromagnetic wave. When they obtain sufficient energy they will escape through the wave guide slot 120 toward the accelerating grid 121 which in turn will drive the electrons to strike the fluorescent screen 122 where they can be observed. Signals having different frequencies within the range of the equipment will give rise to spot traces on different parts of the screen 122 in the same manner as shown in the embodiments of Figures 6 and 11.

Figure 16:
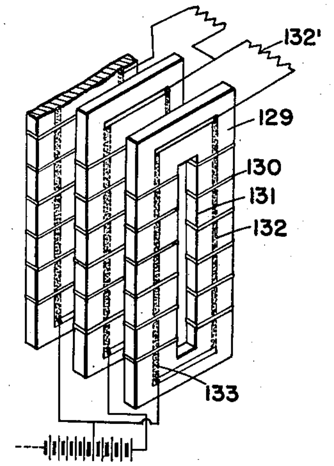
Figure 16 illustrates an alternative from the plate electrodes.

An alternative method of obtaining an electrostatic field that varies in space through the use of a plurality of plate electrodes as in the embodiments of Figures 6 and 11, can be secured through the use of a plurality of plate electrodes parallel to each other and the wave guide as schematically shown in Figure 16. In this alternative construction, each plate electrode is formed as a plate of non-conducting material 129 (Fig. 16) such as ceramic, for example, on which are evenly spaced a number of parallel wires 130 of small diameter approximately in the order of 1 mil. Each wire extends on opposite sides of the electrode 129 and through its slot 131 to form a complete loop.

Extending parallel to the slot 131 and adjacent the opposed edges of the plate are a pair of highly resistive wires 132 and 133, which may be formed from an aluminum alloy, commercially known as "Ohmax," powdered graphite or carbon bonded together by an inert synthetic resin and deposited either directly on the ceramic plate 129 or formed as a separate unit and then attached to the ceramic. Also, these wire elements may be printed upon the ceramic plate in accordance with the well known methods for printed circuits.

The wires 132, 133 when subjected to a flow of current will present a definite voltage drop along its length and as each of these resistive wires is connected across each of the looped wires 130 the voltage drop at selected points on the wires 132, 133 are communicated to the looped wires 130. Hence each looped wire 130 has impressed thereon a voltage equal to the voltage on the high resistive wire at the point where it is crossed by the wire 130, the latter voltage in turn being proportional to the length of wire 132 or 133 from either end.

The voltage drop along the length of a particular plate electrode results in the potential difference between plates at one end being different from the potential difference at the other end. This potential distribution can be maintained either by applying the potentials to both ends of each plate or by means of voltage dropping resistances 132′ shown in Figure 16.

In this way it is possible to achieve the same electrostatic field configuration in the space between the parallel plate electrodes as between the inclined plate electrodes, and the parallel plate electrodes can be substituted for the tilted plate electrodes in the embodiments of Figures 6 and 11.

Figures 17, 19, 20:
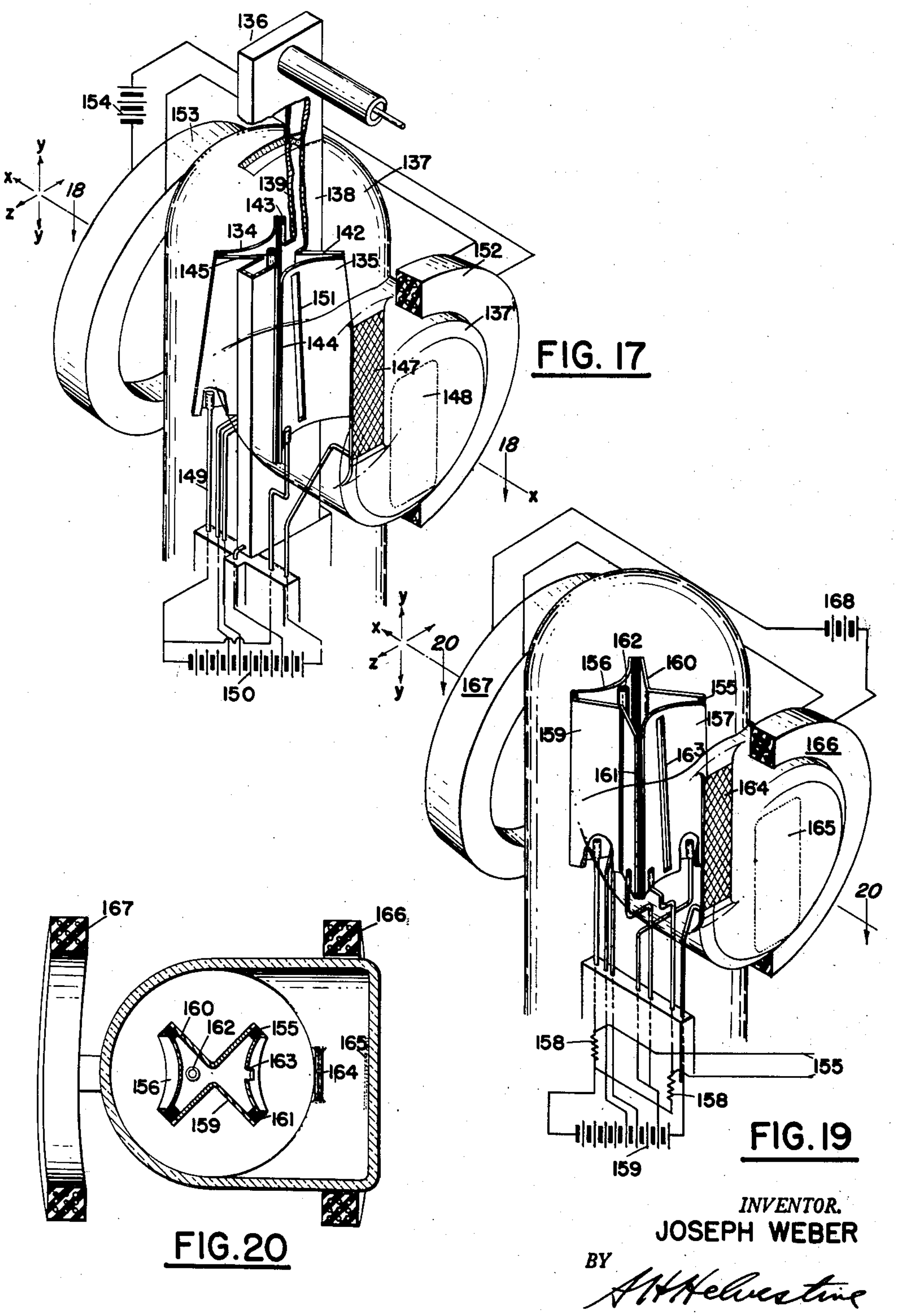
Figure 17 is perspective view of an embodiment employing curved electrodes.
Figure 19 is a perspective view of an alternative construction of the device of Figure 17.
Figure 20 is a transverse cross section through line 20—20 of Figure 19.

A further alternative construction for producing a parabolic electrostatic field, so that the emitted electrons therein will execute simple harmonic motion, is obtained through an interaction space formed by a pair of hyperbolically curved surfaces 134, 135 as shown in the embodiment of Figures 17 and 18 wherein a wave guide 136 is sealed in and through an envelope 137, as in the previous embodiments, parallel to the Y—Z plane. The wave guide side faces 138, 139 are provided with slots 140, 141 (Figure 18) from the edges of which extend wings 142, 143.

The surfaces 134, 135 are tilted toward the wave guide 136, and are held in such relationship by tapered insulating spacers 144 bonded to both the surfaces 134, 135 and the wings 142, 143.

As in the previous embodiments, an accelerating grid 147 and a flourescent screen 148 are provided in a laterally extending portion 137′ of the tube 137. Stem members 149 within the tube form supports for the various elements as well as electrically connecting them to a suitable source of energy such as a battery 150.

A negative potential is applied to both of the curved plate electrodes 134, 135 and a positive potential to the wave guide 136.

The potential of the electrostatic field between the vertices of the electrodes 134, 135, the vertices lying in the plane *g*—*g* (which is parallel to the X—Y plane), for any cross section parallel to the X—Z plane varies in accordance with the parabolic law of variation expressed by Equation 2 wherein the distance X now becomes the distance between the longitudinal central plane *h*—*h* (which is parallel to the Y—Z plane), of the wave guide 136, and a vertex on the hyperbolically-curved plate measured along the plane *g*—*g*, the plane *g*—*g* passing through the vertices and the foci of both hyperbolically-curved plate electrodes 134, 135.

For the assumed frequencies of 1500–750 mcs. the variation of the electrostatic field at the upper portions of the curved plate electrodes is graphically shown also by curve A (Figure 9) and for the lower portions by curve B. It can be shown mathematically that a configuration of electrodes such as these will give a parabolic potential field along plane *g*—*g*.

Thus, electrons emitted from the electron emitter 145 located in plane *g*—*g* will be introduced directly into the interaction space between the hyperbolically-curved electrodes 134, 135 where they will oscillate with simple harmonic motion, with the frequency differing for each cross section parallel to the X—Z plane as in the previous embodiments.

The incoming signal is applied to wave guide 136 and as previously explained, oscillating electrons having periods corresponding with the signal absorb energy and increase their amplitude. Resonant electrons thus acquire sufficient amplitude to escape through the slot 151 in the plate electrode 135 and toward the grid 147 which accelerates the electrons against the flourescent screen 148 where they can be observed. An external magnetic field which is used primarily for focusing purposes is provided by coils 152, 153, suitably energized by a source 154, which sets up a magnetic field parallel to the electron path.

A further modification of the embodiment of Figures 17 and 18, in which the wave guide is omitted and the radio frequency signal fed directly to the hyperbolically-curved plate electrodes, is illustrated by Figures 19 and 20 in which a transmission line 155 feeds the radio frequency signal to the hyperbolically-curved plates 156, 157, resistances 158 isolating the radio frequency signal from a source 159 of direct current energy for polarizing the plates 156, 157. The wave guide 136 of Figure 17 is replaced by V-shaped plate electrodes 159, 160 which, through tapered insulating spacers 161, maintain the plates 156, 157 tilted as in the embodiment of Figure 17. Resonant electrons, from an electron-emitter 162, are projected through slot 163 for acceleration by a grid 164 against a fluorescent screen 165 for visual indications. Focusing coils 166, 167, suitably energized by a source 168, supply the magnetic field as in Figure 17.

In the embodiments of Figures 17, 18, 19 and 20, the electrodes can be parallel to each other instead of inclined if the scheme described with reference to Figure 16 is employed for electrodes 134 and 135 of Figure 17 and electrodes 156 and 157 of Figure 19.

In the embodiments of Figures 6, 11, 13, 17 and 19 each frequency component appears on the flourescent screen as a spot 94 (Figure 10), the position of each spot 94 along the base line being indicative of the frequency component present in the signal being analyzed and the brightness of each spot varying with the amplitude of the frequency component.

Figures 21, 22, 23, 24:
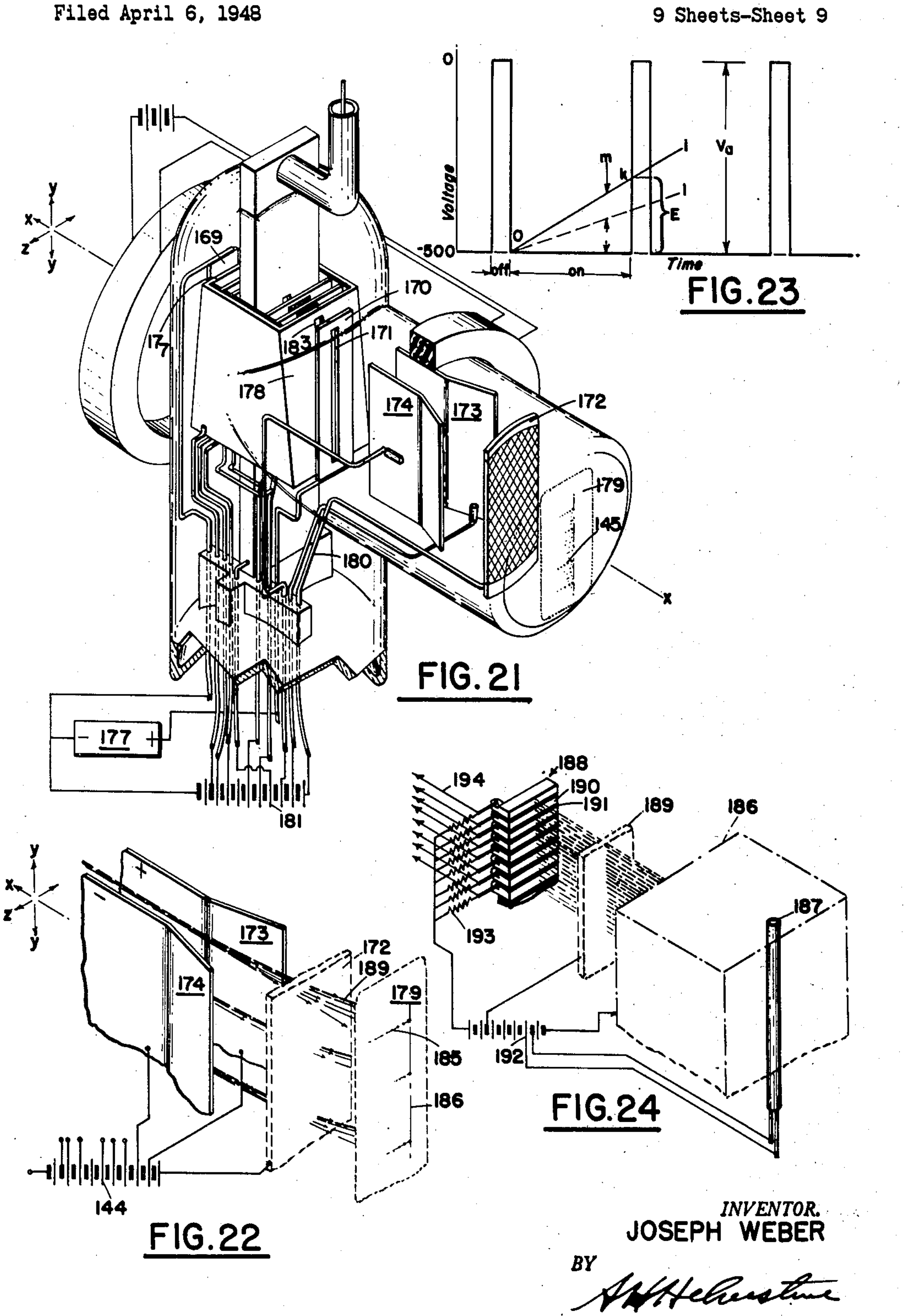
Figure 21 is a perspective view of an embodiment to which have been added certain elements for obtaining a line display instead of the spot display of Figure 3.
Figure 22 is a schematic view illustrating the functioning of the deflecting plates in order to obtain the line display.
Figure 23 is a time-voltage curve pertaining to Figure 21.
Figure 24 is a modification in which the fluorescent screen is replaced by a target plate formed of a series of collector electrodes.

In the event it is desired to obtain a presentation of lines normal to the base line, in lieu of the spots, that is, expand the spots to lines so that the length of each individual line will correspond to the amplitude of its respective frequency component, use is made of additional elements as shown in Figures 21 and 22, with the general construction of the other parts of the device being identical to either Figures 6, 11, 13, 17 or 19. However, for purposes of explanation, the device of Figure 6 is selected, to which are added a back plate electrode 169 and a front plate electrode 170 provided with a slot 171 aligned with the other slots in the original structure. Between the forward plate electrode 170 and the accelerating grid 172 is interposed a pair of deflecting plates 173 and 174 extending parallel to the Y axis and hence at right angles to the front plate electrode 170. The deflecting plates 173, 174 are also parallel to and coextensive with the aligned slots in the various plate electrodes and in the wave guide.

Potentials for the various plate electrodes and the wave guide are applied from a source 181 as in the case of the embodiment of Figure 6. In addition, a rectangular wave generator 177 applies a potential, having the wave shape diagrammatically shown in Figure 23, between the plate electrodes 169 and 170. The potential from the generator 177 is made to vary over a range numerically equal to the difference between the potentials on the electrodes 169 and 178, this latter electrode 178 being the same as electrode 72 of Figure 6.

The deflecting plates 173 and 174 are supplied with a potential such that one of the plates, in this case 173, is made positive with respect to the other plate 174.

To obtain the proper spacing of and potentials on the deflecting plates, use is made of the following equation $$d=\frac{La}{2b}\frac{E_d}{E_a} \qquad (3)$$

where:

$d$=deflection at screen
$L$=length of beam from center of deflection plates to screen
$a$=length of deflection plates
$b$=spacing of deflecting plates
$E_d$=deflecting plate voltage
$E_a$=beam voltage Thus, if it is desired to obtain a screen deflection $d$ of ½ inch, the plates 173, 174 can be made ½ inch wide, spaced ½ inch apart and mounted at a distance of 2 inches from a flourescent screen 179 with a potential of 400 volts on the plate 174 and a potential of 600 volts on the other plate 173.

Substituting these values in Equation 3

$$d=\frac{2(\frac{1}{2})}{2(\frac{1}{2})}\frac{(600-400)}{400}$$
$$=\frac{1}{2}\text{ inch}$$

As in the previous embodiments, wide supports 180 electrically connect the various elements of the tube to their respective base prongs which in turn are connected to appropriate voltage terminals of a power supply, which may be a battery 181.

In operation, the embodiment of Figure 21 functions similar to the embodiments shown in Figures 6, 11, 13, 17 and 19 with the exception that the display of the frequency components is in the form of a series of linear traces or lines 185, instead of dots or spots 94, on the fluorescent screen 179.

The manner of utilizing the resonance phenomenon of the electrons and the applied signal is as already explained. Referring to the waveform shown in Figure 23, $V_a$ represents the range of voltage potential applied to the front plate electrode 170, with the maximum value of $V_a$ being made substantially equal to the difference in potential between plate electrode 169 and electrode 178. This potential difference, with electrode 169 made negative with respect to 178, is made sufficient to set up a potential barrier to prevent resonant electrons from coming through the slot 171 of the front plate electrode 170. For purposes of illustrating this phase of the tube operation and for the assumed frequency range of 1500–750 mcs., a voltage difference $V_a$ between electrodes 169 and 178 is made to vary from, for example, 0 to −500 volts. The duty cycle (ratio of the "on" to the "off" period) of the voltage having the waveform of Figure 23 can be made to vary to suit the demands of the construction of the device, but an "off" period of 1 microsecond and an "on" period of 10 microseconds are selected for the present illustration and so designated on Figure 23.

For an "on" period of 10 microseconds, the potential $V_a$ on the front plate electrode 170 is held at zero relative to the rear plate electrode 169. During this time interval the front plate electrode 170, due to its negative potential, functions as a barrier to prevent the escape through the slot 171 in the plate electrode 170 of any electrons, including those which have gained energy due to their resonance with the signal being analyzed. Hence, those resonant electrons that would have been ordinarily projected against the fluorescent screen 179 as spots are now held back by the plate electrode 169 and 170 in the interaction space.

While being so held back by the potential barrier set up by the potential $V_a$, the electrons continue to oscillate approximately between the limits of the plates 177 and 178. In so doing they continue to absorb energy from the field formed by the signal being analyzed, this rate of absorption of energy being determined by the intensity of this signal field and the time interval elapsing between the release of an electron from the cathode and the termination of the potential barrier $V_a$ on the front plate electrode 178. With the emission from the cathode being at a continuing rate, the electron emitted at the beginning of the "on" part of the voltage cycle, which in this case is taken as −500 volts, will acquire more energy, as indicated by point $k$ on curve $o$—$i$ shown superimposed on the waveform of Figure 23, than, say, an electron that left the cathode at some later interval between the beginning and the ending of the "on" period, which in this case was taken to be 10 microseconds. The rate at which the electrons are held back by the barrier and have this energy increased during the "on" or holding period is graphically indicated by the line *o—i* in Figure 23. The energy so acquired during the withholding period will result in each electron acquiring the capacity of a rate of speed which, when released, is a function of the added energy so acquired. Electrons emitted from the cathode at somewhat later times will have acquired less energy than those electrons represented by the line *o—i*, but as represented by line *o—l*. At the instant the barrier is removed, that is, the end of the "on" period, the electrons will thus have a range E of respective velocities, but the maximum will correspond to the point *k* on line *o—i* and to the signal amplitude, with *m* indicating the difference between the maximum and other velocities of the respective electrons at any particular instant during the "on" period.

At the end of the "on" period the voltage potential $V_a$ changes to a potential substantially equal to that of the plates 177, 178, which marks the beginning of the "off" period, allowing the electrons with their respectively acquired energies to be suddenly released for movement through the slot 177 of the plate electrode 170. The velocity with which the electrons pass between the deflecting plates 173, 174 is a function of the energy each electron acquired during the "on" or withholding portion of the waveform of Figure 23.

The stream of expelled electrons as they flow between the deflecting plates 173, 174 will be deflected by the electrostatic field formed between these plates in a manner well known in the cathode-ray tube art. The electrons, being of course negatively charged, are attracted toward the positive plate 173. The amount that an electron is deflected or pulled off its normal straight course, is dependent on the speed at which the electron is traveling and the voltage applied to the deflecting plates. Thus, as a slow-moving electron is in the electrostatic field a relatively long time, the attractive force of the electrostatic field has a relatively long time to act, and can pull the electron further toward the positive plate than when the electron is in the field for only a short time.

Thus, the expelled resonant electrons will move between the deflecting plates within the range of velocities E, as a result of which each electron will be deflected toward the positive plate by amounts determined by their respective velocities, resulting in the electron stream spreading out, as diagrammatically shown in Figure 22 resulting in the display of discrete linear traces 185 the height or amplitude of each discrete linear trace being related to the maximum electron velocity which in turn is related to the strength of the signal wave being analyzed. The positions of the linear traces along a base or reference line 186 is in accordance with the respective frequency components as in the case of the spot traces mentioned in the previous figures.

Although a fluorescent screen is employed in the various embodiments for the portrayal of the frequency components of a radio frequency signal, such information can be similarly recorded upon or by other means, such as facsimile, or television for transmission and reproduction or indication at points distant from the actual analyzer. A method for distantly reproducing such information is illustrated by Figure 24. It is to be understood that this method is applicable to any of the embodiments herein described and the internal structure, excepting the accelerating grid and screen, is generally indicated by 186 containing the electron emitter 187. In place of a fluorescent screen, a collector electrode 188 is placed forward of the accelerating screen 189. The collector electrode is formed from discrete segments 190 bonded together by insulating strips 191 with each segment being polarized from a suitable source such as battery 192 through individual insulating resistors 193 in a manner well known to the radio art. Each segment 190 is in turn connected to independent devices, not shown, through lines 194 for indicating individually the respective frequency components of that portion of the frequency spectrum being investigated. These independent devices may assume various forms, such as for example aural indicating devices, as a signal bell, or visual indicating devices as a meter.

In all of the embodiments, except that shown in Figures 2 and 5, only the resonant electrons are projected toward the accelerating screen and these are collected by collector electrode 188. The embodiment of Figures 2 and 5, is used with collector electrode 188 by installing an electrode for preventing non-resonant electrons from reaching 188. This is accomplished by making use of the fact that the radii of the helices of the resonant electrons are much greater than the radii of the helices of the non-resonant electrons. The additional electrode which has a thickness greater than the non-resonant radii and a length equal to that of slot 55 of Figures 2 and 5 and parallel to it in the path of the electrons, outside of the guide 49, intercepts the non-resonant electrons and allows the resonant electrons, which have diameters greater than the additional electrode thickness, to continue on to collector electrode 188.

As in the previous embodiments, the resonant electrons will strike the collector electrode, which in this case is the segmented collector electrode 188, the particular segment 190 being struck depending upon the frequency component present in the device as already explained. The resonant electrons striking a segment 190 will cause current to flow from that segment through its associated circuit 194 and means connected to the circuit to cause the means to function.

In the previous embodiments explained, the evacuated envelope was indicated as being formed of transparent material in order that the fluorescent screen can be observed. However, the evacuated container need not be wholly transparent and, with the exception of a window for observing the screen, it can be formed of any suitable material. Thus, in the modification of Figure 24, where visual indications are not displayed, a transparent container is not required.

Due to the fact that resonant electrons will fall upon the different segments 190 depending upon the frequency component present, the device of Figure 24 will also function as a filtering device for separating any or all frequency components of a complex signal. Electrons striking the segments 190 will result in a current flow from such segments through its respective associated circuits 194. Hence by closing a certain circuit 194 from an appropriate segment 190 with due regard to the cross section of the parabolic field within the structure 186, only those electrons corresponding to a particular frequency component, whose presence it is desired to be made known, will activate its circuit 194. Collector electrode 188 can take a variety of other forms and could be placed in a number of different positions depending on the current or voltage indications which it is desired to transmit. In other cases more than one electrode of this type could be employed.

In all of the embodiments except those of Figures 2 and 5 a parabolic potential field is employed to insure that electrons in a given cross section will oscillate with a period independent of the amplitude. It can be shown that the parabolic law is not the only law which permits oscillation with a period which is independent of amplitude. For example, a cycloidal variation of potential with distance also will give this type of motion. It is, therefore, evident that any of these other laws of variation could be used with this device. The parabolic law however is the most convenient and most practical one to use.

To spread the visual indications, the view on the fluorescent screen may be enlarged, such as by a magnifying glass, or by focusing the optical image upon a mosaic photosensitive surface and electronically scanning as in the iconoscope.

In the various embodiments of the invention, the source of electrons is shown as emanating from a continuous elongated filament. However, for the proper functioning of the invention it is not necessary that the electrons be emitted from such elements for the electrons may emanate from a series of discrete electron-emission surfaces aligned in a row parallel to the Y-axis. Such surfaces may be end-coated cathodes, each being similar to the cathode of the modern cathode-ray tube, or individual filaments, directly or indirectly heated. The aligned row of electron-emissive surfaces thus form an elongated source and function equivalent to a single elongated element.

In all cases the orientation of the electron-emitter and the potential applied to it must be such that each point on the filament has the same potential as the space immediately surrounding it. This is accomplished in either of two ways. In the first, the emitter is located parallel to the plates and the voltage drop throughout its length is maintained between its ends corresponding to that of the adjacent plates. In the second, the filament is inclined to the adjacent plates, in a plane parallel to the electron motion.

In several of the embodiments shown the radio frequency field is produced by waves propagating down a rectangular wave guide. It is apparent that any wave guidance system of conductors which produces an electric field component in a direction parallel to the short dimension of the wave guide can be employed for this purpose. It should be clear that each device can be made to cover a different group of frequencies of consecutive portions of the radio frequency spectrum. The devices can thus be operated in parallel so that portions of the spectrum beyond the capacity of any single device can be simultaneously investigated. The exact physical dimensions of any of the embodiments depend upon the band width of the radio frequency spectrum to be investigated and the frequencies displayed.

In all of the above embodiments the usual technique of cathode ray tube construction, such as the proper use of aquadag on certain portions of the glass envelope, are observed.

Although in illustrating certain aspects of the different embodiments, definite values have been given but only for purposes of further illustrating the invention and such values are not to be construed as limiting factors, it being obvious that the voltage potentials and the physical relationship between the tube elements to obtain proper operating conditions of these embodiments are matters of selection and adjustment.

Thus, the various embodiments shown are capable of breaking up any complex alternating electromagnetic wave into its fundamental and harmonics within the capacity of the respective devices.

Obviously many modifications and variations of the present invention are possible in the light of the above teachings. It is therefore to be understood that within the scope of the appended claims the invention may be practiced otherwise than as specifially desuribed.

The invention described herein may be manufactured and used by or for the Government of the United States of America for governmental purposes without the payment of any royalties thereon or therefor.

Having thus described the invention, what is claimed is:

1. In a frequency analyzer, the combination of an evacuated container, an elongated source of electrons therein, a target electrode parallel to and coextensive with said elongated source energized to attract electrons therefrom, means adjacent said container for establishing a magnetic field perpendicular to and surrounding said source urging said electrons moving toward said target electrode into paths substantially parallel to said magnetic field, the intensity of said field being constant in time but increasing in intensity along the length of said source, a wave guide in said container disposed between said elongated source and said target electrode to be energized by alternating wave energy to produce an oscillatory electric field perpendicular to said magnetic field, whereby said fields produce harmonic motion in said electrons of a frequency determined by the intensity of the magnetic field in the path and electrons in paths resonant with said electric field are accelerated.

2. In a frequency analyzer, the combination of a pair of hyperbolically-curved electrodes spaced from each other, means applying to said electrodes an alternating potential whose frequency is to be determined, an elongated electron-emissive body positioned in a plane extending substantially through the focii of said electrodes, means establishing a magnetic field through said electrodes perpendicular to said elongated body, said magnetic field increasing in intensity in space along the length of said body.

3. In a frequency analyzer, the combination of a pair of hyperbolically-curved electrodes spaced from each other, means applying to said electrodes an alternating potential whose frequency components are to be determined, an elongated electron-emissive body positioned in a plane extending substantially through the focii of said electrodes, said electrodes being inclined toward a plane equidistant between the electrode focii and normal to the plane therethrough, and means establishing a magnetic field through said electrodes parallel to the plane through the electrode focii, said magnetic field being constant in time and substantially uniform in intensity along the length of said body.

4. In the combination described in claim 3 wherein one of said electrodes is provided with an elongated slot parallel to and coextensive with the elongated electron-emissive body and a target spaced from and parallel with said slot.

5. In a frequency analyzer device, the combination comprising an evacuated substantially T-shaped envelope having an elongated portion and a side portion extending laterally therefrom, a base mounting said envelope, a waveguide of substantially rectangular cross section in said elongated portion extending lengthwise of the same, said waveguide being anchored on said base and sealed into and through the walls of said elongated portion of said envelope, said waveguide having opposed end faces extending parallel to each other and provided with an entrance and an exit slot, respectively, a magnetic coil mounted on said side portion and lying in a plane parallel to said opposed end faces, a magnetic coil mounted against said elongated portion and lying in a plane at an angle to said opposed end faces, said coils forming a magnetic field extending through said envelope with the intensity of the magnetic field varying along the length of said slots, an electron-emitting element in said elongated portion spaced from said entrance slot, a control grid interposed between said electron-emitting element and said entrance slot, a fluorescent target in said side portion and spaced from said exit slot, a secondary control grid interposed between said exit slot and said fluorescent target, said electron-emitting element, said slots, said grids and said fluorescent target being substantially in alignment and parallelly coextensive with each other, means whereby suitable energizing potentials are applied to said electron-emitting element, waveguide and grids, and means whereby a radio frequency potential is applied to said waveguide.

6. In a frequency analyzer device, the combination comprising an evacuated envelope, a waveguide of substantially rectangular cross section in said envelope and sealed into and through the walls thereof said waveguide having opposed end faces extending parallel to each other and provided with an entrance and an exit slot, respectively, a magnetic coil mounted against one side of said envelope in a plane parallel to said opposed end faces, a magnetic coil mounted against the opposite side of said envelope in a plane at an angle to said opposed end faces, said coils forming a magnetic field extending through said envelope with the intensity of the magnetic field varying along the length of said slots, an electron-emitting element in said envelope spaced from said entrance slot, a control grid interposed between said electron-emitting element and said entrance slot, a fluorescent target in said envelope spaced from said exit slot, a secondary control grid interposed between said exit slot and said fluorescent target, said electron-emitting element, said slots, said grids and said fluorescent target being substantially in alignment and parallelly coextensive with each other, means whereby suitable energizing potentials are applied to said electron-emitting element, waveguide and grids, and means whereby a radio frequency potential is applied to said waveguide.

7. In a frequency aanlyzer device, the combination comprising an evacuated envelope, a waveguide in said envelope having opposed end faces extending parallel to each other and provided with an entrance and an exit slot, respectively, magnetic coils mounted on opposed portions of said envelope forming a magnetic field extending through said envelope with the intensity of the magnetic field progressively increasing along the length of said slots, an elongated electron-emitting element in said envelope spaced from said entrance slot, a control grid interposed between said electron-emitting element and said entrance slot energized to attract electrons from said element in a direction parallel to said magnetic field, a fluorescent target in said envelope spaced from said exit slot, a secondary control grid interposed between said exit slot and said fluorescent target energized to control electron movement toward said target, said electron-emitting element, said slots, said grids and said fluorescent target being substantially in alignment and parallelly coextensive with each other, and means for energizing said wave guide from a source of oscillatory electromagnetic energy to produce an oscillatory electric field perpendicular to said magnetic field to cause harmonic motion in said electrons, said electrons moving toward said target being resonant to frequencies in accordance with the strength of said magnetic field in the path thereof, whereby electrons in paths resonant with said oscillatory electric field are accelerated to produce an indication on said screen in a position relative to the length of said element indicative of the frequency of said electro-magnetic energy.

8. In an electronic device, an evacuated envelope, means establishing a magnetic field therethrough along a first axis, said magnetic field being constant in time and varying in intensity ($\beta$) along a second axis perpendicular to the first axis, an elongated electron-emitting element within said evacuated envelope, a fluorescent target within the same and spaced from said electron-emitting element, said element and target extending co-extensively to each other and parallel to the second axis, said electron-emitting element adapted to emit electrons along the length thereof, said electrons when emitted travel in respective path components parallel to the magnetic flux with a predetermined translational velocity while moving in circular orbit path components in planes perpendicular to the magnetic flux with angular velocities ($2\pi f_1$) related to the intensity ($\beta$) of the magnetic field by the equation $$f_1=\frac{1}{2\pi}\frac{e}{m}\beta$$

where $e$ and $m$ are the charge and the mass of the electrons, respectively, thereby causing said electrons to move in respective helical paths toward said fluorescent target, means establishing an electric field through said evacuated envelope along a third axis and varying in time with a frequency ($f_2$) whereby the radii of the circular orbits of only those electrons moving with angular velocities having a frequency ($f_1$) equal to the frequency ($f_2$) of the electric field will increase causing such electrons to acquire added energy to strike the fluorescent target with sufficient force to cause a visual indication on said target, said axes being mutually perpendicular to each other, and a control device interposed between said electron-emitting element and said fluorescent target for controlling the initial translational velocity of the electrons from said electron-emitting element.

9. In an electronic device, means establishing a magnetic field along a first axis, said magnetic field being constant in time and varying in intensity ($\beta$) along a second axis perpendicular to the first axis, an elongated electron-emitting element within said magnetic field, a target within the same and spaced from said electron-emitting element, said element and target extending co-extensively to each other and parallel to the second axis, said electron-emitting element adapted to emit electrons along the length thereof, said electrons when emitted travel in respective path components parallel to the magnetic flux with a predetermined translational velocity while moving in circular orbit path components in planes perpendicular to the magnetic flux, said electrons bodily rotating in their circular orbits with angular velocities ($2\pi f_1$) related to the intensity ($\beta$) of the magnetic field by the equation $$f_1=\frac{1}{2\pi}\frac{e}{m}\beta$$

where $e$ and $m$ are the charge and the mass of the electrons, respectively, thereby causing said electrons to move in respective helical paths toward said target, means establishing an electric field through said magnetic field along a third axis and varying in time with a frequency ($f_2$) whereby the radii of the circular orbits of only those electrons moving with angular velocities having a frequency ($f_1$) equal to the frequency ($f_2$) of the electric field will increase causing such electrons to acquire added energy to strike the target with sufficient force to cause an indication, said axes being mutually perpendicular to each other, and a control device interposed between said electron-emitting element and said target for controlling the initial translational velocity of the electrons from said electron-emitting element.

10. In an electronic device, means establishing a magnetic field along a first axis, said magnetic field being constant in time and varying in intensity ($\beta$) along a second axis perpendicular to the first axis, an elongated electron-emitting element within said magnetic field, a target within the same and spaced from said electron-emitting element, said element and target extending co-extensively to each other and parallel to the second axis, said electron-emitting element adapted to emit electrons along the length thereof, said electrons when emitted travel in respective path components parallel to the magnetic flux with a predetermined translational velocity while moving in circular orbit path components in planes perpendicular to the magnetic flux, said electrons bodily rotating in their respective circular orbits with angular velocities ($2\pi f_1$) related to the intensity ($\beta$) of the magnetic field by the equation $$f_1=\frac{1}{2\pi}\frac{e}{m}\beta$$

where $e$ and m are the charge and the mass of the electrons, respectively, thereby causing said electrons to move in respective helical paths toward said target, means establishing an electric field through said magnetic field along a third axis and varying in time in accordance with a complex alternating electromagnetic wave whereby only those electrons having frequencies ($f_1$) equal to the frequency ($f_2$) of the components of the electromagnetic wave will accept energy from the electric field to increase the radii of their respective circular orbits such that the respective electrons will acquire sufficient energy to cause an indication on said target, said axes being mutually perpendicular to each other and a control device interposed between said electron-emitting element and said target for controlling the initial translational velocity of the electrons from said electron-emitting element.

11. The combination of claim 5 and adjustable means on the analyzer device supporting the magnetic coils whereby the same may be adjusted relative to each other for adjusting the intensity of the magnetic field along the length of the slots.

12. The combination of claim 6 and means on the analyzer device for adjustably positioning the magnetic coils relative to each other for varying the degree of intensity of the magnetic field along the length of the slots.

13. The combination of claim 10 and means for varying the degree of intensity ($\beta$) along the second axis.

14. In a frequency analyzer device comprising an evacuated envelope, a base mounting said envelope, an electron-emitting element in said envelope producing electrons in a plurality of positions in a plane, a target spaced from said electron-emitting element, a coil supporting means carried by said envelope, diametrically-opposite coils on said supporting means establishing a magnetic field about said electron-emitting element for causing the electrons emitted therefrom to follow predetermined paths between said electron-emitting element and said target substantially parallel to the lines of flux of the magnetic field, said supporting means being adjustable whereby either of said coils may be adjusted independently of and relative to each other and said electron-emitting element for controlling the direction of the predetermined paths toward said target, means in said envelope interposed between said electron-emitting element and said target adapted to establish a parabolic electric field parallel to the magnetic field and having a gradient therein in a direction perpendicular to said magnetic field for rendering said electrons resonant to differing frequencies in accordance with the intensity of said fields in the paths thereof, and means associated with the last said means establishing the electric field and adapted to add thereto an oscillatory electric field having the frequency components of an alternating complex electromagnetic wave causing the electric field to vary in intensity and in synchronism with the wave, whereby those electrons moving in the predetermined paths resonant at a frequency component present in the wave will be projected against said target with sufficient force to cause an indication.

15. A frequency analyzer device comprising an evacuated envelope, an elongated electron-emitting source therein adapted to emit electrons along points thereof, an accelerating grid within said envelope spaced from said electron-emitting source, an indicating means in said envelope spaced from said accelerating grid, said electron-emitting source, accelerating grid and indicating means being substantially parallel and coextensive with each other, magnetic means about said envelope providing a magnetic field perpendicular to and surrounding said electron-emitting source, said magnetic field being uniform in space and constant in time thereby causing electrons emitted from successive points on said electron-emitting source to move in respective paths substantially parallel to the magnetic flux, electrostatic means establishing an electrostatic field along said electron-emitting source and parallel to said magnetic field, said electrostatic field increasing progressively in intensity at said successive electron paths in a direction parallel to said electron-emitting source and the respective intensity of said electrostatic field on each electron path having a parabolically varying potential gradient whereby the electrons are caused to oscillate in their respective paths with a frequency of oscillation progressively varying with said successive points on said electron-emitting source, exciter means connected to said electrostatic means for feeding thereto an alternating wave whose frequency components it is desired to be determined whereby said electrostatic field is caused to vary in time with said wave thereby causing these electrons having a frequency of oscillation equal to the frequency of the wave or any component part thereof to be projected toward said accelerating grid, the latter in turn accelerating the projected electrons against said indicating means.

16. A frequency analyzer device comprising an evacuated envelope, an elongated electron-emitting source therein adapted to emit electrons along points thereof, an accelerating grid within said envelope spaced from said electron-emitting source, an indicating means in said envelope spaced from said accelerating grid, said electron-emitting source, accelerating grid and indicating means being substantially parallel and coextensive with each other, magnetic means about said envelope providing a magnetic field perpendicular to and surrounding said electron-emitting source, said magnetic field being uniform in space and constant in time thereby causing electrons emitted from successive points on said electron-emitting source to move in respective paths substantially parallel to the magnetic flux, a tapered waveguide along the length of said electron-emitting source, a medial electrode in said waveguide extending in the longitudinal central plane thereof energized to attract electrons from said source, a plurality of electrodes interposed between said waveguide and said medial electrode converging toward the plane of said medial electrode, said waveguide and electrodes having slots therein coextensive with said electron-emitting source, the path of electrons being through said slots, exciting means attached to said waveguide for feeding thereto an alternating wave, and means energizing said wave guide and said electrodes to produce a parabolic electrostatic field relative to said medial electrode decreasing in intensity with the spacing of said electrodes whereby electrons moving in said paths are rendered resonant to different frequencies in accordance with the intensity of said electrostatic field and electrons moving in paths resonant to a frequency component of said electrostatic field are accelerated.

17. A frequency analyzer comprising an evacuated envelope, a rectangular waveguide having opposed end faces and side faces hermetically sealed into and through the walls of the envelope, a first group of spaced plate electrodes opposite and spaced from one side face of said waveguide, a second group of spaced plate electrodes opposite and spaced from the other side face of the waveguide, corresponding plate electrodes of each group connected together to form a pair of equipotential surfaces, said electrodes lying in planes converging on a longitudinal medial plane of said waveguide at acute angles thereto, insulating means anchored to the end faces of said waveguide, end plates anchored to said insulating means, said end plates supporting corresponding plate electrodes outermost from said waveguide, said insulating means supporting the remaining of said plate electrodes, an elongated electron-emissive device mounted between a plate electrode outermost from said waveguide and a plate electrode adjacent said outermost plate electrode, said plate electrodes with the exception of said outermost plate and side faces of said waveguide being provided with longitudinally extending slots coextensive with said electron-emissive device, means for impressing voltage potentials on said waveguide and plate electrodes, said voltage potentials decreasing with the increase in distance of said plate electrodes from said waveguide whereby electrons emitted from said electron-emissive device are caused to oscillate through said slots with different frequencies, said frequencies progressively varying along the length of the waveguide, means for impressing a signal on said waveguide whereby electrons oscillating with a frequency equal to the frequency of a component of the signal is projected through the slot in the outermost plate, a fluorescent screen in said envelope, an accelerating grid aligned with said outermost plate for accelerating the projected electrons toward the fluorescent screen whereby a visual indication of the accelerated electrons is indicated, magnetic means on said envelope forming a magnetic flux substantially perpendicular to the plates and waveguide whereby the movement of electrons is confined to respective definite paths parallel to the magnetic flux.

18. A frequency analyzer device comprising an evacuated envelope, a fluorescent screen therein, a plurality of spaced converging electrodes within said envelope, said electrodes being adapted to be connected to suitable polarizing potentials of increasing magnitude, respectively, with the polarizing potentials varying with the electrode spacing in accordance with the equation $$V=C-\tfrac{1}{2}KX^2$$

where V is the polarizing potential on an electrode, C is numerically the highest polarizing potential on said electrode, K is a constant of proportionality dependent upon the frequency range of the device and X is the distance between adjacent electrodes whereby a non-uniform electrostatic field is formed, a linear source of electrons within the electrostatic field for emitting electrons therein, means feeding an alternating wave into said tube whereby electrons resonant at a frequency component of the alternating wave will acquire sufficient energy to be projected against said fluorescent screen and magnetic focusing means adjacent said tube creating lines of magnetic flux through the same for maintaining the flow of electrons from said source to said fluorescent screen along respective predetermined paths substantially parallel to the lines of magnetic flux whereby the region of electron emission, region of impingement of electrons on said fluorescent screen and the electron path therebetween lying in a common path parallel to the lines of magnetic flux of said magnetic focusing means.

19. The combination of claim 17 and a back plate electrode and a front plate electrode spaced beyond said end plate electrodes, respectively, and a pair of deflecting plates interposed between said front plate electrode and the fluorescent screen, said front plate electrode having a slot aligned with the slot in the outermost plate electrode and lying in a plane midway between said deflecting plates.

20. The combination of claim 5 and means carried by said base whereby the magnetic coils may be adjusted relative to each other.

21. In an electronic device for determining the component frequencies of a complex alternating wave, an elongated cathode for emitting electrons, a target electrode parallel to and coextensive with said elongated cathode energized to attract electrons from said cathode means producing a magnetic field parallel to the perpendicular bisector of said cathode and said target electrode for urging said electrons moving toward said target electrode into parallel paths, means producing an oscillatory electric field having the frequency components of said complex alternating wave acting on said electrons moving in response to said energization of said target electrode, means producing a gradient in a plane parallel to said cathode in one of said fields rendering said electrons resonant to differing frequencies in accordance with the strength of the gradient field in the particular path, whereby said electrons moving in said paths are selectively accelerated by said oscillatory electric field by resonance therebetween.

22. In an electronic device for indicating the component frequencies of a complex alternating wave, an elongated cathode for emitting electrons, an elongated target electrode substantially parallel to and co-extensive with said cathode energized to attract electrons therefrom, means producing a magnetic field having magnetic lines of force substantially parallel to the perpendicular bisector of said cathode and said target electrode for urging said electrodes to follow substantially parallel paths toward said target electrode, means producing an oscillatory electric field having the frequency components of said complex alternating wave acting on said electrons moving toward said target electrode, means producing a gradient in one of said fields along a line parallel to the length of said cathode rendering electrons moving in said paths resonant to differing frequencies in accordance with the strength of said gradient field in the particular field, whereby said electrons moving in said paths are selectively accelerated by said oscillatory electric field in accordance with resonance between said electrons and said electric field, and indicator means substantially parallel to said cathode responsive to impingement of accelerated electrons thereon to produce an indication at a position relative to the length of said cathode corresponding to a frequency component of said alternating wave.

23. In an electronic device for measuring the component frequencies of a complex alternating wave, an elongated cathode emitting electrons, an elongated target electrode substantially parallel to said cathode energized for attracting electrons from said cathode, means producing a magnetic field substantially parallel to the perpendicular bisector of said cathode and said target electrode for urging said electrons moving from said cathode into parallel paths substantially perpendicular to said cathode, means producing an oscillatory electric field having the frequency components of said complex wave acting on said electrons moving in said paths, means producing a substantially uniform gradient in one of said fields parallel to the length of said cathode rendering said electrons in said paths resonant at differing frequencies in accordance with the intensity of the gradient field in the particular path whereby said electrons moving in said paths are accelerated by said oscillatory electric field in accordance with resonances between said electrons and said oscillatory electric field, and fluorescent indicating means parallel to said cathode responsive to accelerated electrons impinging thereon to indicate the position relative to the length of said cathode of electrons in paths resonant to frequency components of said complex alternating wave.

24. In a frequency analyzing device, an evacuated container, a source emitting charged particles in a plane, a target electrode energized to attract charged particles from said source, means for producing a magnetic field urging said charged particles moving toward said target electrode into paths substantially parallel to said magnetic field, means for producing an alternating electric field having a frequency equal to that of an alternating wave to be analyzed reacting with said charged particles moving in said paths toward said target electrode, the intensity of one of said fields increasing progressively along the length of cathode to vary the oscillatory frequency of said charged particles in accordance with the longitudinal position of its path relative to said source whereby said charged particles are accelerated by said electric field in accordance with the frequency of said electric field and the relative longitudinal position of its path relative to said source, and indicator means parallel to and co-extensive with said source responsive to impingement thereon of accelerated particles to produce an indication at a position determined by the frequency of said alternating current wave.

25. In a system for analyzing a complex alternating wave, an elongated source of charged particles, an elongated target electrode parallel with said source energized to attract said charged particles, a magnetic field constant in time parallel to a line passing through said source and said target electrode and perpendicular thereto to urge said charged particles into substantially parallel paths toward said target electrode, means producing an oscillatory electric field having the frequency components of said complex alternating wave, said electric field acting on said charged particles moving in response to said energization, means producing a gradient in one of said fields in a direction parallel to said source rendering said charged particles resonant at differing frequencies in accordance with the particular field strength of said gradient field whereby said oscillatory electric field produces modified particle motion in accordance with the strength of said gradient field and with the longitudinal position of said particles relative the length of said source.

26. In a frequency analyzing system, an elongated source of charged particles, a target electrode parallel to and co-extensive with said source adapted to attract said charged particles from said source, means establishing a magnetic field constant in time adapted to react, with said charged particles moving from said source to said target electrode, means for establishing an alternating electric field perpendicular to said magnetic field having a frequency corresponding to the frequency of said alternating current wave to be analyzed, the intensity of one of said field increasing substantially linearly along the longitudinal dimension of said source, whereby said charged particles moving toward said target electrode in different sections perpendicular to said cathode are selectively accelerated by said alternating current field, and collector means parallel to and co-extensive with said cathode responsive with impingement of accelerated charged particles thereon to produce an indication in a longitudinal position corresponding to the frequency of said alternating current wave.

27. In an electronic device for measuring the frequency components of an alternating wave, an elongated cathode emitting electrons, an elongated target electrode energized for attracting electrons from said cathode, electromagnetic coils energized to produce a magnetic field substantially parallel to the perpendicular bisector of said cathode and said elongated target electrode for urging said electrons into substantially parallel paths parallel to said magnetic field, means producing an oscillatory electric field perpendicular to said magnetic field and to said cathode containing the frequency components of said alternating wave acting on said electrons moving in said paths to cause electron oscillation, means inclining said electromagnetic coils relative to each other to produce a gradient in said magnetic field parallel to the length of said cathode for rendering said electrons moving in said paths resonant to differing frequencies in accordance with the strength of the magnetic field at the respective paths, whereby said oscillatory electric field selectively accelerates electrons in paths having frequencies corresponding to the frequency components of said electric field.

28. In an electronic device for measuring the frequency components of a complex alternating wave, an elongated cathode emitting electrons, an elongated target electrode substantially parallel to said cathode, electromagnetic coils energized to produce a magnetic field parallel to the perpendicular bisector of said cathode and said target electrode for urging said electrons moving toward said target electrode into paths parallel to said magnetic field, means producing an oscillatory electric field perpendicular to said magnetic field and to said cathode having the frequency components of said complex alternating wave acting on said electrons moving in said paths to cause electron oscillation, means inclining said electromagnetic coils relative to each other to produce a substantially linear gradient in said magnetic field in the direction of the length of said cathode to render said electrons moving in said paths resonant to differing frequencies in accordance with the strength of said magnetic field in said paths, whereby said oscillatory electric field accelerates electrons in paths resonant with the frequency components therewith, and indicator means parallel to said cathode responsive to impingement thereon to indicate the position of said impingement relative to the length of said cathode.

29. In an electronic device for measuring the component frequencies of a complex alternating wave, an elongated cathode emitting electrons, an elongated target electrode substantially parallel to said elongated cathode energized to attract electrons from said cathode means for producing a magnetic field constant in time having a region surrounding said elongated cathode and said elongated target electrode having magnetic lines of force approximately parallel to a line interconnecting the midpoints of said cathode and said target electrode for urging said electrons moving toward said target electrode into substantially parallel paths following said magnetic lines of force, means for impressing said complex wave as an oscillatory electric field substantially parallel to said magnetic field on said electrons moving in said paths to cause harmonic motion therein, electrode means energized to produce a gradient in said electric field along a line substantially parallel to said cathode to vary the resonant frequencies of said electrons moving in said paths in accordance with the strength of said electric field in the particular paths, whereby said electrons moving in said paths resonant to a frequency component of said electric field are progressively accelerated, and indicator means substantially parallel to said cathode responsive to impingement of accelerated electrons thereon to indicate the longitudinal position of said resonant electron paths relative to said cathode.

30. In an electronic device for measuring the component frequencies of a complex alternating wave, an elongated cathode, a target electrode substantially parallel to said cathode energized to attract electrons therefrom, means producing a magnetic field constant in time having a region substantially parallel to a line bisecting said cathode and said target electrode for urging said electrons moving toward said target electrode into paths substantially following the lines of said magnetic field, means impressing said complex alternating wave as an electric field substantially parallel to said electron paths in said region to cause electron oscillation, electrode means energized to add a gradient to said oscillatory electric field along a line parallel to the length of said cathode to vary the resonance of said electrons moving in said paths in accordance with the strength of said oscillatory electric field at the particular path, whereby electrons moving in particular paths are accelerated by said oscillatory electric field in accordance with resonance between component frequencies and said paths.

31. In an electronic device for measuring the component frequencies of a complex alternating wave, a pair of target electrodes each composed of a pair of angularly disposed plates symmetrically disposed relative to a first plane passing through the lines of convergence of said plates, an elongated cathode emitting electrons parallel to said lines of convergence and equidistant therefrom, said target electrodes being energized to attract electrons from said cathode, means producing a magnetic field constant in time having magnetic lines of force substantially perpendicular to said cathode and to said first plane to urge electrons moving from said cathode into paths substantially parallel to said magnetic lines of force, a pair of hyperbolic electrodes symmetrical to a second plane perpendicular to said first plane and passing through said cathode, means impressing said complex alternating wave on said hyperbolic electrodes for producing an oscillatory electric field acting on electrons in said paths to produce oscillation therein, means biasing said hyperbolic plates to render said electrons in said paths responsive to harmonic motion in accordance with strength of the electric field at the path and means converging said hyperbolic plates toward said first plane to vary the resonant frequency of electrons moving in said paths in accordance with the spacing of said hyperbolic electrodes from said target electrodes, whereby electrons moving in paths resonant at frequencies present in said complex alternating wave are accelerated, and a phosphorescent screen responsive to impingement of accelerated electrons thereon to indicate the longitudinal position of said impingement relative to said cathode.

32. In an electronic device for measuring the component frequencies of a complex alternating wave, an elongated cathode emitting electrons, a pair of target electrodes each having its longitudinal axis substantially parallel with said cathode and energized to attract electrons from said cathode, said target electrodes being parallel and adjacent to each other and equidistant from said cathode, means for producing a magnetic field constant in time having a region containing substantially parallel magnetic lines substantially parallel to a line passing through the center of said cathode and between said target electrodes adjacent the longitudinal centers thereof for urging said electrons into paths substantially parallel to said magnetic field, electrode means for impressing said complex wave as an oscillatory electric field substantially parallel to said magnetic field to cause harmonic motion of said electrons, said electrode means comprising hyperbolic plates symmetrically disposed with respect to said line passing through said cathode and to said target electrons, means biasing said electrodes to repel said electrons to produce resonant frequencies in said electrons moving in said paths and means converging said hyperbolic plates toward the longitudinal axis of said target electrodes to produce a gradient in said electric field in a direction parallel to said cathode to vary the resonance of said electrons moving in said paths in accordance with the strength of said electric field at the particular path, whereby electrons in paths resonant to a frequency component of said oscillatory electric field are accelerated, and indicator means parallel to said cathode responsive to impingement thereon of accelerated electrons to indicate the longitudinal position of said impingements.

33. The device claimed in claim 29 which includes a blocking electrode between said indicator means and said means producing said oscillatory electric field normally energized to prevent impingement of said accelerated electrons on said indicator means, deflecting means parallel to said cathode and symmetrically disposed relative to said electron paths between said blocking electrode and said indicator means energized to deflect electrons moving therebetween in a direction perpendicular to said paths and to said cathode in accordance with the speed of the electrons, and periodic means removing said energization from said blocking electrode, whereby said accelerated electrons move through said deflecting means in lateral positions indicative of the acceleration of said electrons and in longitudinal positions indicative of the resonant frequency of electrons in said path.

34. A measuring device for determining characteristics of input signals comprising, an elongated electron source providing a supply of electrons, an elongated fluorescent screen disposed in a plane spaced from the elongated electron source for providing an indication when electrons from the electron source reach the screen with sufficient velocity to produce activation thereof, an elongated electron-pervious accelerating electrode disposed between the electron source and the fluorescent screen for accelerating electrons into a ribbon stream having a finite width in a plane including the electron source and the fluorescent screen, first field producing means for providing a steady field component having a gradient from one width extreme of the electron stream to the other width extreme thereof whereby electrons in different portions of the stream travel between the electron source and the fluorescent screen in helical paths at different velocities, and second field producing means for providing a signal varying field component uniform over the width of the electron ribbon stream whereby electrons traveling with certain velocities are accelerated to increased velocity by input signals.

35. A measuring device for determining characteristics of input signals comprising, an elongated electron source providing a supply of electrons, an elongated fluorescent screen disposed in a plane including the elongated electron source for providing an indication when electrons from the electron source reach the screen with sufficient velocity to produce activation thereof, an elongated electron-pervious accelerating electrode disposed between the electron source and the fluorescent screen and in the plane thereof for accelerating electrons into a ribbon stream having a finite width in the plane including the electron source and the fluorescent screen, first field producing means for providing a steady field component having a gradient from one width extreme of the electron stream to the other width extreme thereof whereby electrons in different portions of the steam travel between the electron source and the fluorescent screen in helical paths at different velocities, second field producing means for providing a signal varying field component uniform over the width of the electron ribbon stream whereby electrons traveling with certain velocities are accelerated to increase velocity by input signals, and third field producing means for providing between the second field producing means and the elongated electron-pervious accelerating electrode a deflection field having a force perpendicular to the width dimension of the ribbon stream to the direction of travel of the electron ribbon stream.

36. A measuring device for determining characteristics of inputs signals comprising, an elongated electron source providing a supply of electrons, an elongated fluorescent screen disposed in a plane including the elongated electron source for providing an indication when electrons from the electron source reach the screen with sufficient velocity to produce activation thereof, an elongated electron-pervious accelerating electrode disposed between the electron source and the fluorescent screen and in the plane thereof for accelerating electrons into a ribbon stream having a finite width in the plane including the electron source and the fluorescent screen, first field producing means for providing a steady field component having a gradient from one width extreme of the electron stream to the other width extreme thereof whereby electrons in different portions of the stream travel between the electron source and the fluorescent screen in helical paths at different velocities, second field producing means for providing a signal varying field component uniform over the width of the electron ribbon stream whereby electrons traveling with certain velocities are accelerated to increased velocity by input signals, and electrostatic deflection means for providing between the second field producing means and the elongated electron-pervious accelerating electrode an electrostatic deflection field perpendicular to both the width dimension of the electron ribbon stream and to the direction of travel of the electron ribbon stream.

37. A measuring device for determining characteristics of input signals comprising, an elongated fluorescent screen disposed in a plane including the elongated electron source for providing an indication when electrons from the electron source reach the screen with sufficient velocity to produce activation thereof, an elongated electron-pervious accelerating electrode disposed between the electron source and the fluorescent screen and in the plane thereof for accelerating electrons into a ribbon stream having a finite width in the plane including the electron source and the fluorescent screen, first field producing means for providing a steady field component having a gradient from one width extreme of the electron stream to the other width extreme thereof whereby electrons in different portions of the stream travel between the electron source and the fluorescent screen in helical paths at different velocities, second field producing means for providing a signal varying field component uniform over the width of the electron ribbon stream whereby electrons traveling with certain velocities are accelerated to increased velocity by input signals, first and second electrostatic deflection plates disposed on opposing sides of the electron ribbon stream substantially parallel to the electron ribbon stream in the region thereof between the second field producing means and the elongated electron-pervious accelerating electrode, and power supply means for maintaining the electrostatic deflection plates at different relative potentials.

38. An electronic device for determining the component frequencies of an alternating current wave comprising means constituting a path for producing an electron ribbon stream having a finite width, a collector electrode disposed in said path to attract the electrons therein, magnetic means adjacent said path for producing a magnetic field substantially parallel to said path for urging said electrons moving toward said collector electrode into substantially parallel trajectories, a wave guide coupled to said path for producing an oscillatory electric field having the freqeuncy of the alternating current wave, and field forming means adjacent said path for producing a field gradient in one of said fields in a plane substantially perpendicular to the path for rendering said electrons resonant to different frequencies in accordance with the strengths of said fields, whereby electrons moving in said electron path are selectively accelerated by said oscillatory electric field by resonance therewith.

39. An electronic device for determining the component frequencies of an alternating current wave comprising means constituting a path for producing an electron ribbon stream having a finite width, a collector electrode disposed in said path to attract the electrons therein, magnetic means adjacent said path for producing a magnetic field substantially parallel to said path for urging said electrons moving toward said collector electrode into substantially parallel trajectories, a wave guide coupled to said path for producing an oscillatory electric field having the frequency of the alternating current wave, field forming means adjacent said path for producing a field gradient in one of said fields in a plane substantially perpendicular to the path in one of said fields for rendering said electrons resonant to different frequencies in accordance with the strengths of said fields, whereby electrons moving in said electron path are selectively accelerated by said oscillatory electric field by resonance therewith, and indicator means extending across the width of said path responsive to impingement thereon of accelerated electrons to produce an indication at a position determined by the frequency of said alternating current wave.

References Cited in the file of this patent

UNITED STATES PATENTS

| | | |
|---|---|---|
| 2,079,085 | Richter et al. | May 4, 1937 |
| 2,092,814 | Schaffernicht | Sept. 14, 1937 |
| 2,131,185 | Knoll | Sept. 27, 1938 |
| 2,138,928 | Klemperer | Dec. 6, 1938 |
| 2,287,307 | Herbst | June 23, 1942 |
| 2,407,298 | Skellett | Sept. 10, 1946 |
| 2,421,043 | Tomlin | May 27, 1947 |